US012752583B2

(12) United States Patent
Al Sakka et al.

(10) Patent No.: US 12,752,583 B2
(45) Date of Patent: Oct. 6, 2026

(54) VEHICLE SUSPENSION SYSTEM WITH ROLL MOMENT DISTRIBUTION CONTROL

(71) Applicant: Advanced Suspension Technology LLC, Northville, MI (US)

(72) Inventors: Monzer Al Sakka, Sint-Truiden (BE); Miguel Dhaens, Lommel (BE)

(73) Assignee: Advanced Suspension Technology LLC, Northville, MI (US)

( * ) Notice: Subject to any disclaimer, the term of this patent is extended or adjusted under 35 U.S.C. 154(b) by 718 days.

(21) Appl. No.: 18/197,411

(22) Filed: May 15, 2023

(65) Prior Publication Data

US 2024/0383295 A1 Nov. 21, 2024

(51) Int. Cl.

| | |
|---|---|
| ***B60G 13/08*** | (2006.01) |
| ***B60G 17/015*** | (2006.01) |
| ***B60G 17/016*** | (2006.01) |
| ***B60G 17/08*** | (2006.01) |

(Continued)

(52) U.S. Cl.

CPC ......... *B60G 17/0152* (2013.01); *B60G 13/08* (2013.01); *B60G 17/016* (2013.01); *B60G 17/08* (2013.01); *F15B 1/26* (2013.01); *F15B 13/06* (2013.01); *B60G 2202/24* (2013.01);

(Continued)

(58) Field of Classification Search

CPC .... B60G 17/0152; B60G 13/08; B60G 17/08; B60G 17/016; B60G 2400/0511; B60G 2400/512; B60G 2500/10; B60G 2202/416; B60G 2204/82; B60G 2204/8304; B60G 2800/012; B60G 2800/014;

(Continued)

(56) References Cited

U.S. PATENT DOCUMENTS 2,184,202 A * 12/1939 Tschanz ................. B60G 21/06 280/5.506
5,562,305 A 10/1996 Heyring et al.
5,919,240 A 7/1999 Ney et al.

(Continued)

FOREIGN PATENT DOCUMENTS

CN 103807344 A 5/2014
CN 204037280 U 12/2014

(Continued)

*Primary Examiner* — Bradley T King
*Assistant Examiner* — James K Hsiao
(74) *Attorney, Agent, or Firm* — Harness, Dickey & Pierce, P.L.C.

(57) ABSTRACT

A suspension system including four dampers each having a compression chamber and a rebound chamber. First and second hydraulic circuits interconnect the compression and rebound chambers of the front dampers, while third and fourth hydraulic circuits interconnect the compression and rebound chambers of the back dampers. A first bi-directional pump is connected in-line with a first longitudinal hydraulic line that extends between the first and third hydraulic circuits and a second bi-directional pump is connected in-line with a second longitudinal hydraulic line that extends between the second and fourth hydraulic circuits. The first and second bi-directional pumps can pump independently on one another, in the same direction at the same time, or in opposite directions at the same time. The level of pitch and roll stiffness can be adjusted by running the first and second bi-directional pumps to change the pressure in select hydraulic circuits of the system.

18 Claims, 10 Drawing Sheets

(51) Int. Cl.
*F15B 1/26* (2006.01)
*F15B 13/06* (2006.01)

(52) U.S. Cl.
CPC ................. *B60G 2400/0511* (2013.01); *B60G 2400/0512* (2013.01); *B60G 2500/10* (2013.01)

(58) Field of Classification Search
CPC ......................... B60G 17/0164; B60G 21/067; B60G 21/073; B60G 17/0162; F15B 1/26; F15B 13/06
See application file for complete search history.

(56) References Cited

U.S. PATENT DOCUMENTS

| | | | | |
|---|---|---|---|---|
| 6,010,139 | A | 1/2000 | Heyring et al. | |
| 6,264,212 | B1 * | 7/2001 | Timoney | B60G 21/10 280/124.159 |
| 6,270,098 | B1 * | 8/2001 | Heyring | B60G 17/033 280/6.155 |
| 6,519,517 | B1 * | 2/2003 | Heyring | B60G 21/10 280/124.159 |
| 6,851,679 | B2 * | 2/2005 | Downey | B60G 21/073 280/5.511 |
| 7,240,906 | B2 * | 7/2007 | Klees | B60G 21/10 280/5.502 |
| 7,472,914 | B2 | 1/2009 | Anderson et al. | |
| 7,686,309 | B2 | 3/2010 | Munday et al. | |
| 7,751,959 | B2 * | 7/2010 | Boon | B60G 21/073 251/74 |
| 7,789,398 | B2 * | 9/2010 | Munday | B60G 21/06 280/5.506 |
| 8,123,235 | B2 | 2/2012 | Monk et al. | |
| 8,695,768 | B2 | 4/2014 | Kiriyama | |
| 8,776,961 | B2 * | 7/2014 | Mori | B60G 17/08 188/266.2 |
| 9,061,735 | B2 * | 6/2015 | Heyring | B63B 39/00 |
| 9,080,631 | B2 | 7/2015 | Hoult | |
| 10,315,736 | B2 | 6/2019 | Monk | |
| 10,331,143 | B2 * | 6/2019 | Monk | B63B 39/04 |
| 10,358,010 | B2 * | 7/2019 | Boon | B60G 21/06 |
| 11,220,152 | B2 * | 1/2022 | Witte | B60G 17/0152 |
| 11,390,129 | B1 * | 7/2022 | Edren | B60G 17/0155 |
| 11,529,836 | B1 * | 12/2022 | Schubart | B60G 21/073 |
| 11,584,185 | B1 * | 2/2023 | Schubart | B60G 17/018 |
| 11,685,220 | B2 * | 6/2023 | Calchand | B60G 17/016 280/5.515 |
| 11,865,887 | B2 * | 1/2024 | Boon | B60G 17/0152 |
| 11,865,889 | B2 * | 1/2024 | Vandersmissen | B60G 17/08 |
| 11,938,772 | B2 * | 3/2024 | Vandersmissen | B60G 17/0152 |
| 11,945,557 | B2 * | 4/2024 | Walker | B63B 39/03 |
| 12,083,848 | B1 | 9/2024 | Dhaens et al. | |
| 12,227,052 | B2 * | 2/2025 | Al Sakka | B60G 17/005 |
| 12,269,311 | B2 * | 4/2025 | Boon | B60G 13/08 |
| 2004/0113377 | A1 * | 6/2004 | Klees | B60G 21/073 280/5.514 |
| 2006/0151969 | A1 * | 7/2006 | Revill | B60G 17/056 280/124.162 |
| 2006/0287791 | A1 * | 12/2006 | Boon | B60G 21/073 701/37 |
| 2008/0129000 | A1 * | 6/2008 | Munday | B60G 21/06 280/5.502 |
| 2008/0272561 | A1 * | 11/2008 | Monk | B60G 21/06 280/124.16 |
| 2009/0140501 | A1 * | 6/2009 | Taylor | B60G 21/06 280/5.508 |
| 2012/0305347 | A1 * | 12/2012 | Mori | B60G 17/08 188/266.2 |
| 2015/0224845 | A1 * | 8/2015 | Anderson | F03G 7/081 701/37 |
| 2015/0360532 | A1 * | 12/2015 | Kim | B60G 17/021 280/5.5 |
| 2018/0345747 | A1 * | 12/2018 | Boon | B60G 17/018 |
| 2019/0225044 | A1 * | 7/2019 | Witte | B60G 21/026 |
| 2021/0155068 | A1 * | 5/2021 | Stabel | B60G 11/02 |
| 2021/0197640 | A1 * | 7/2021 | Yamashita | B60G 21/067 |
| 2022/0144035 | A1 * | 5/2022 | Al Sakka | B60G 21/10 |
| 2022/0281280 | A1 * | 9/2022 | Praet | B60G 17/06 |
| 2022/0380004 | A1 * | 12/2022 | Walker | B60G 17/08 |
| 2023/0111977 | A1 * | 4/2023 | Boon | B60G 17/01908 701/37 |
| 2023/0112405 | A1 * | 4/2023 | Calchand | B60G 11/265 280/5.515 |
| 2023/0113777 | A1 | 4/2023 | Vandersmissen et al. | |
| 2023/0113819 | A1 * | 4/2023 | Vandersmissen | B60G 17/0164 280/5.507 |
| 2023/0114717 | A1 * | 4/2023 | Boon | B60G 21/073 701/37 |
| 2023/0115594 | A1 | 4/2023 | Calchand et al. | |
| 2023/0278387 | A1 | 9/2023 | Birch et al. | |
| 2024/0383303 | A1 * | 11/2024 | Al Sakka | B60G 17/08 |
| 2024/0383304 | A1 * | 11/2024 | Al Sakka | B60G 17/0162 |

FOREIGN PATENT DOCUMENTS

| | | | |
|---|---|---|---|
| CN | 204037282 | U | 12/2014 |
| CN | 207059676 | U | 3/2018 |
| CN | 207902078 | U | 9/2018 |
| CN | 214057159 | U | 8/2021 |
| CN | 113382921 | B | 3/2024 |
| DE | 102013021589 | A1 | 6/2015 |
| DE | 102020001633 | A1 | 10/2020 |
| WO | WO-2007098559 | A1 | 9/2007 |
| WO | WO-2020214666 | A1 | 10/2020 |

* cited by examiner

VEHICLE SUSPENSION SYSTEM WITH ROLL MOMENT DISTRIBUTION CONTROL

FIELD

The present disclosure relates generally to suspension systems for motor vehicles and more particularly to suspension systems that resist pitch and roll movements of a vehicle.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean right or left during corning (e.g., in turns), pitch forward under deceleration (e.g., under braking), and pitch back under acceleration. The lateral acceleration the vehicle experiences in turns causes a roll moment where the vehicle will lean/roll to the right when turning left and to the left when turning right. The fore and aft acceleration the vehicle experiences under acceleration and braking causes a pitch moment where the vehicle will lean/dive forward, loading the front axle during braking, and lean/squat rearward (aft), loading the rear axle, under acceleration. These roll and pitch moments decrease grip, cornering performance, and braking performance and can also be uncomfortable to the driver and passengers. Many vehicles are equipped with stabilizer bars/anti-roll bars, which are mechanical systems that help counteract the roll moments experienced during driving. For example, anti-roll bars are typically mechanical linkages that extend laterally across the width of the vehicle between the right and left dampers. When one of the dampers extends, the anti-roll bar applies a force to the opposite damper that counteracts the roll moment of the vehicle and helps to correct the roll angle to provide flatter cornering. However, there are several drawbacks associated with these mechanical systems. First, there are often packaging constraints associated with mechanical systems because a stabilizer bar/anti-roll bar requires a relatively straight, unobstructed path across the vehicle between the dampers. Second, stabilizer bars/anti-roll bars are reactive and work when the suspension starts moving (i.e. leaning) and therefore are not pro-active to stop roll before it begins. Such mechanical systems also cannot be easily switched off or cancelled out when roll stiffness is not needed. Some vehicles do have stabilizer bar/anti-roll bar disconnects that may be manually or electronically actuated, but the complexity and cost associated with these systems make them ill-suited for most vehicle applications. In addition, typical stabilizer bars/anti-roll bars do not provide additional pitch stiffness or pitch control.

In an effort to augment or replace traditional mechanical stabilizer bars/anti-roll bars, anti-roll suspension systems are being developed that hydraulically connect two or more dampers in a hydraulic circuit where the extension of one damper produces a pressure change in the other damper(s) in the hydraulic circuit that makes it more difficult to compress the other damper(s) in the hydraulic circuit. This pressure change in the other damper(s) increases the roll stiffness of the suspension system of the vehicle. However, the downside of such systems is that ride comfort is more difficult to achieve because bump forces can be transmitted from one damper to another damper across the hydraulic circuit resulting in unwanted suspension movement. Accordingly, there remains a need for improved vehicle suspension systems that can minimize roll, pitch, and other unwanted suspension movements while maintaining acceptable levels of ride comfort.

SUMMARY

This section provides a general summary of the disclosure, and is not a comprehensive disclosure of its full scope or all of its features.

In accordance with one aspect of the subject disclosure, a suspension system is provided that includes four dampers: a front left damper, a front right damper, a back left damper, and a back right damper. The front left damper includes a first compression chamber and a first rebound chamber. The front right damper includes a second compression chamber and a second rebound chamber. The back left damper includes a third compression chamber and a third rebound chamber. The back right damper includes a fourth compression chamber and a fourth rebound chamber.

The suspension system of the present disclosure also includes four hydraulic circuits: a first hydraulic circuit connects the first compression chamber of the front left damper in fluid communication with the second rebound chamber of the front right damper, a second hydraulic circuit connects the first rebound chamber of the front left damper in fluid communication with the second compression chamber of the front right damper, a third hydraulic circuit connects the third compression chamber of the back left damper in fluid communication with the fourth rebound chamber of the back right damper, and a fourth hydraulic circuit connects the third rebound chamber of the back right damper in fluid communication with the fourth compression chamber of the back right damper. The suspension system also has a first longitudinal hydraulic line that extends between and fluidly connects the first and third hydraulic circuits and a second longitudinal hydraulic line that extends between and fluidly connects the second and fourth hydraulic circuits.

The suspension system of the present disclosure further comprises a first bi-directional pump that is arranged along and fluidly connected to the first longitudinal hydraulic line and a second bi-directional pump that is arranged along and fluidly connected to the second longitudinal hydraulic line. The first bi-directional pump has a first operating mode for pumping hydraulic fluid in a first direction from the first hydraulic circuit to the third hydraulic circuit and a second operating mode for pumping hydraulic fluid in a second direction from the third hydraulic circuit to the first hydraulic circuit. The second bi-directional pump has a third operating mode for pumping hydraulic fluid in a third direction from the second hydraulic circuit to the fourth hydraulic circuit and a fourth operating mode for pumping hydraulic fluid in a fourth direction from the fourth hydraulic circuit to the second hydraulic circuit.

In accordance with another aspect of the present disclosure, the suspension system further comprises one or more controllers that are electrically connected to the first and second bi-directional pumps. The one or more controllers are programmed to activate one of the first or second operating modes of the first bi-directional pump and one of the third or fourth operating modes of the second bi-directional pump at the same time or independently. The first and second bi-directional pumps may be activated to pump fluid in the same direction (i.e., towards the front axle or towards the rear axle) during some operating modes (e.g., in the roll moment distribution control and pitch control operating modes) or the first and second bi-directional pumps may be activated to pump in opposite directions during other operating modes (e.g., in the warp control operating mode).

In accordance with another aspect of the present disclosure, the suspension system further comprises a reservoir that is arranged in fluid communication with at least one of the first and second longitudinal hydraulic lines and a third bi-directional pump that is arranged between and fluidly connected to the reservoir and at least one of the first and second longitudinal hydraulic lines. The third bi-directional pump has a fifth operating mode for pumping hydraulic fluid in a fifth direction from the reservoir to at least one of the first and second longitudinal hydraulic lines and a sixth operating mode for pumping hydraulic fluid in a sixth direction from at least one of the first and second longitudinal hydraulic lines to the reservoir.

Advantageously, the suspension system of the present disclosure is able to reduce/eliminate vehicle pitch and roll movements for improved grip, performance, handling, and braking. The reduction of pitch and roll angles improves the comfort, steering feel, agility, and stability of the vehicle. Pitch and roll control is provided by increasing the pitch stiffness or roll stiffness of the suspension system based on the fluid pressure in the system. The level of pitch and roll stiffness can be adjusted by using the bi-directional pumps to change the pressure in select hydraulic circuits of the system. Valves in the hydraulic circuits can also be opened to decouple the dampers in situations where added pitch and/or roll stiffness is not desired or necessary.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
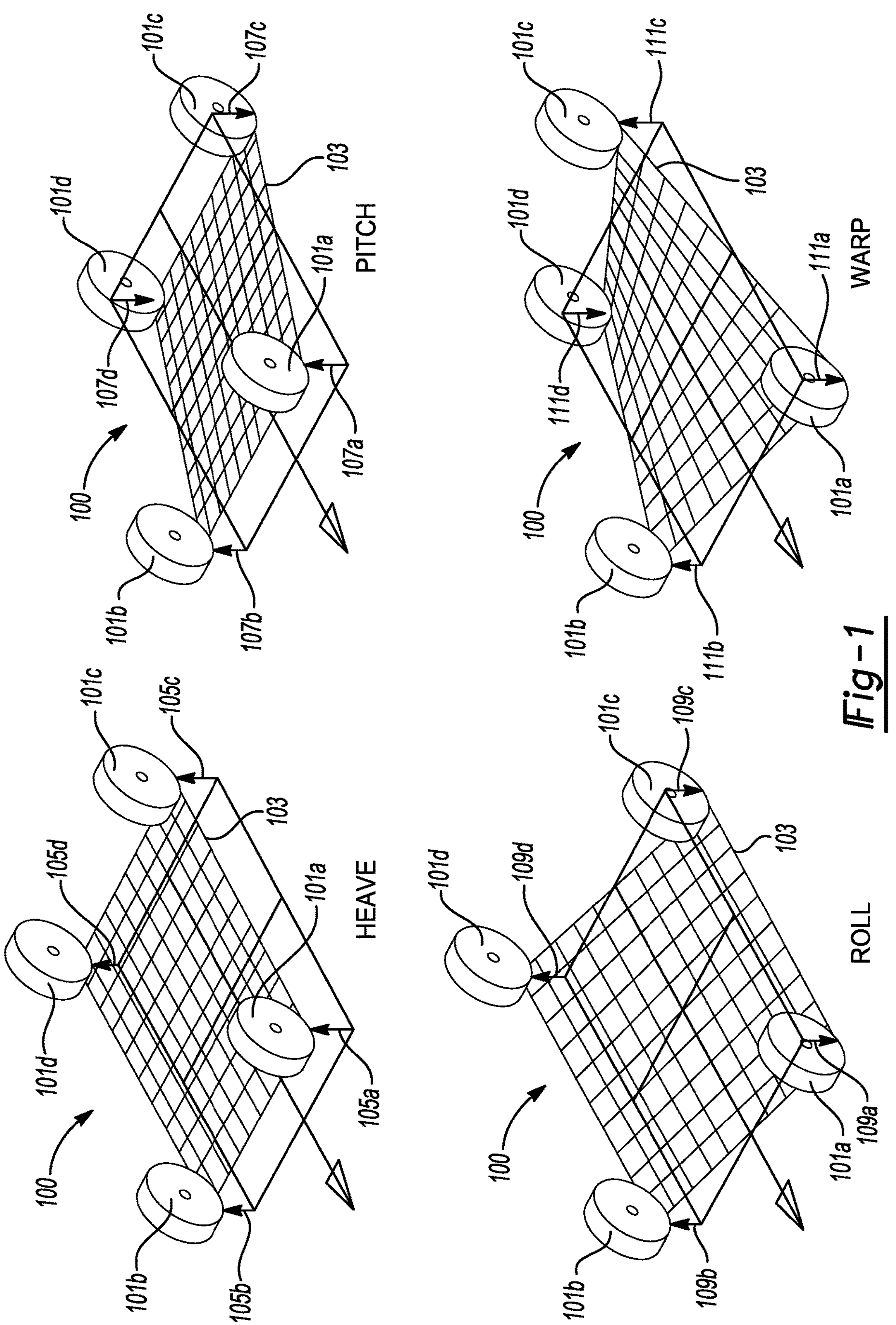
FIG. 1 is a schematic diagram illustrating an exemplary vehicle suspension system as it experiences suspension heave, pitch, roll, and warp.

Referring to the Figures, wherein like numerals indicate corresponding parts throughout the several views, various comfort valve equipped suspension systems are shown.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, the term "controller(s)" may be replaced with the term "electrical circuit(s)." For example, the term "controller(s)" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller(s) may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

With reference to FIG. 1, a suspension system 100 for a vehicle is illustrated. The vehicle includes a front left wheel 101*a*, a front right wheel 101*b*, a back left wheel 101*c*, and a back right wheel 101*d*. While it should be appreciated that the vehicle may include a different number of wheels than those shown in FIG. 1, in most automotive applications, four wheels are used at each corner of the vehicle body 103. As shown in FIG. 1, there are four different types of suspension movements that vehicles routinely experience-heave, pitch, roll, and warp. When the suspension system 100 of the vehicle experiences heave, the vehicle body 103 either lifts (as illustrated in FIG. 1), such as when the vehicle travels over a crest (i.e., hill), or drops, such as when the vehicle travels over a dip (i.e., valley) in the road, which results in either a downward movement (not shown) or upward movement 105*a*-105*d* (as shown) of all four wheels 101*a*-101*d* simultaneously or nearly simultaneously. When the suspension system 100 of the vehicle experiences pitch, either the front of the vehicle body 103 lifts and the rear of the vehicle body 103 drops, such as during hard acceleration, or the front of the vehicle body 103 drops and the rear of the vehicle body 103 lifts, such as during hard braking. In the example shown in FIG. 1 illustrating pitch, the front of the vehicle body 103 is lifting and the rear of the vehicle body 103 is dropping (i.e., pitching aft), the front wheels 101*a*, 101*b* experience upward movement 107*a*, 107*b* while the rear wheels 101*c*, 101*d* experience downward movement 107*c*, 107*d*. The opposite occurs when the front of the vehicle body 103 is dropping and the rear of the vehicle body 103 is lifting (i.e., pitching forward). When the suspension system 100 of the vehicle experiences roll, either the right side of the vehicle body 103 lifts and the left side of the vehicle body 103 drops, such as during a hard right turn, or the right side of the vehicle body 103 drops and the left side of the vehicle body 103 lifts, such as during a hard left turn. In the example shown in FIG. 1 illustrating roll, when the right side of the vehicle body 103 is lifting and the left side of the vehicle body 103 is dropping (i.e., rolling left), the right wheels 101*b*, 101*d* experience upward movement 109*b*, 109*d* while the left wheels 101*a*, 101*c* experience downward movement 109*a*, 109*c*. The opposite occurs when the right side of the vehicle body 103 is dropping and the left side of the vehicle body 103 is lifting (i.e., rolling right). When the suspension system 100 of the vehicle experiences warp, either the front right and back left wheels 101*b*, 101*c* experience lifting (i.e., upward) movement 111*b*, 111*c* while the front left and back right wheels 101*a*, 101*d* experience dropping (i.e., downward) movement 111*a*, 111*d* (as illustrated in FIG. 1) or the front right and back left wheels 101*b*, 101*c* drop while the front left and back right wheels 101*a*, 101*d* lift. As will be explained in greater detail below, the object of the suspension system 100 described herein is to reduce or eliminate these movements.

Figure 2:
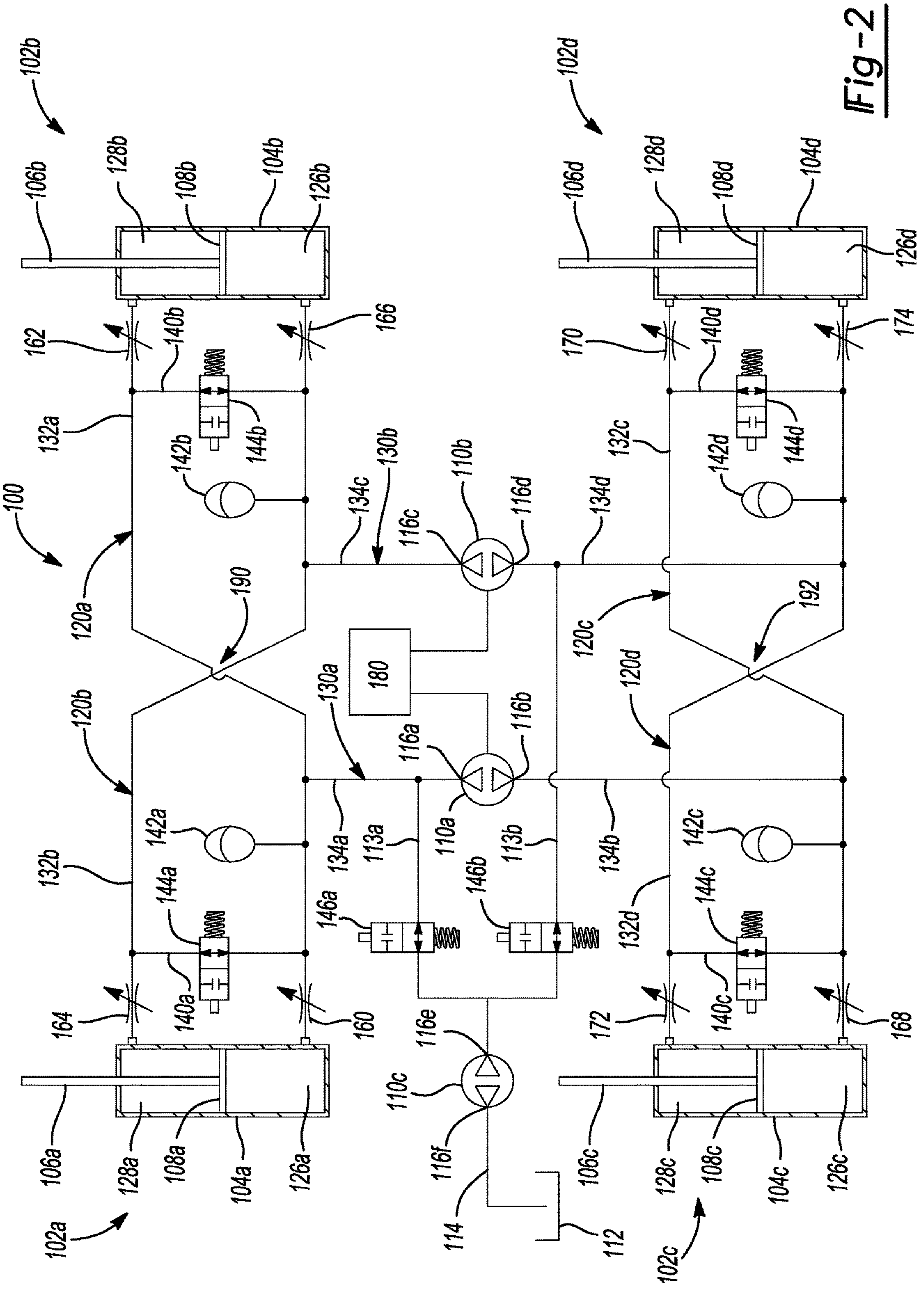
FIG. 2 is a schematic diagram illustrating an exemplary suspension system of the present disclosure that includes three bi-directional pumps.

With reference to FIG. 2, the suspension system 100 includes a front left damper 102*a*, a front right damper 102*b*, a back left damper 102*c*, and a back right damper 102*d*. While it should be appreciated that the suspension system 100 described herein may include a different number of dampers than those shown in the drawings, in most automotive applications, four dampers are used at each corner of a vehicle to control vertical movements of the front and rear wheels 101*a*-101*d* of the vehicle.

Each of the dampers 102*a*, 102*b*, 102*c*, 102*d* of the suspension system 100 includes a damper housing 104*a*, 104*b*, 104*c*, 104*d*, a piston rod 106*a*, 106*b*, 106*c*, 106*d*, and a piston 108*a*, 108*b*, 108*c*, 108*d* that is mounted on the piston rod 106*a*, 106*b*, 106*c*, 106*d*. The pistons 108*a*, 108*b*, 108*c*, 108*d* are closed pistons with no fluid flow paths defined within or by the piston structure. The pistons 108*a*, 108*b*, 108*c*, 108*d* are arranged in sliding engagement with and inside the damper housings 104*a*, 104*b*, 104*c*, 104*d* such that the pistons 108*a*, 108*b*, 108*c*, 108*d* divide each damper housing 104*a*, 104*b*, 104*c*, 104*d* into compression and rebound chambers. As such, the front left damper 102*a* includes a first compression chamber 126*a* and a first rebound chamber 128*a*, the front right damper 102*b* includes a second compression chamber 126*b* and a second rebound chamber 128*b*, the back left damper 102*c* includes a third compression chamber 126*c* and a third rebound chamber 128*c*, and the back right damper 102*d* includes a fourth compression chamber 126*d* and a fourth rebound chamber 128*d*. The rebound chambers 128*a*, 128*b*, 128*c*, 128*d* of the dampers 102*a*, 102*b*, 102*c*, 102*d* decrease in volume during rebound/extension strokes and increase in volume during compression strokes of the dampers 102*a*, 102*b*, 102*c*, 102*d*. The compression chambers 126*a*, 126*b*, 126*c*, 126*d* of the dampers 102*a*, 102*b*, 102*c*, 102*d* decrease in volume during compression strokes of the dampers 102*a*, 102*b*, 102*c*, 102*d* and increase in volume during rebound/extension strokes of the dampers 102*a*, 102*b*, 102*c*, 102*d*.

The first compression chamber 126*a* of the front left damper 102*a* is connected in fluid communication with the second rebound chamber 128*b* of the front right damper 102*b* via a first hydraulic circuit 120*a*. The first hydraulic circuit 120*a* includes a first hydraulic line 132*a* that extends between and fluidly connects the first compression chamber 126*a* of the front left damper 102*a* and the second rebound chamber 128*b* of the front right damper 102*b*. The first rebound chamber 128*a* of the front left damper 102*a* is connected in fluid communication with the second compression chamber 126*b* of the front right damper 102*b* via a second hydraulic circuit 120*b*. The second hydraulic circuit 120*b* includes a second hydraulic line 132*b* that extends between and fluidly connects the first rebound chamber 128*a* of the front left damper 102*a* and the second compression chamber 126*b* of the front right damper 102*b*. Thus, the first and second hydraulic lines 132*a*, 132*b* of the first and second hydraulic circuits 120*a*, 120*b* cross-over one another at a first cross-over point 190.

The third compression chamber 126*c* of the back left damper 102*c* is connected in fluid communication with the fourth rebound chamber 128*d* of the back right damper 102*d* via a third hydraulic circuit 120*c*. The third hydraulic circuit 120*c* includes a third hydraulic line 132*c* that extends between and fluidly connects third compression chamber 126*c* of the back left damper 102*c* and the fourth rebound chamber 128*d* of the back right damper 102*d*. The third rebound chamber 128*c* of the back left damper 102*c* is connected in fluid communication with the fourth compression chamber 126*d* of the back right damper 102*d* via a fourth hydraulic circuit 120*d*. The fourth hydraulic circuit 120*d* includes a fourth hydraulic line 132*d* that extends between and fluidly connects the third rebound chamber 128*c* of the back left damper 102*c* and the fourth compression chamber 126*d* of the back right damper 102*d*. Thus, the third and fourth hydraulic lines 132*c*, 132*d* of the third and fourth hydraulic circuits 120*c*, 120*d* cross-over one another at a second cross-over point 192.

The suspension system 100 also includes a first longitudinal hydraulic line 130*a* that extends between and fluidly connects the first hydraulic circuit 120*a* and the third hydraulic circuit 120*c* and a second longitudinal hydraulic line 130*b* that extends between and fluidly connects the second hydraulic circuit 120*b* and the fourth hydraulic circuit 120*d*. A first bi-directional pump 110*a* is arranged along and connected in-line with the first longitudinal hydraulic line 130*a* and a second bi-directional pump 110*b* is arranged along and connected in-line with the second longitudinal hydraulic line 130*b*. The first longitudinal hydraulic line 130*a* includes a first hydraulic line segment 134*a* that extends between and fluidly connects the first hydraulic line 132*a* with a first port 116*a* on the first bi-directional pump 110*a* and a second hydraulic line segment 134*b* that extends between and fluidly connects the third hydraulic line 132*c* with a second port 116*b* on the first bi-directional pump 110*a*. The second longitudinal hydraulic line 130*b* includes a third hydraulic line segment 134*c* that extends between and fluidly connects the second hydraulic line 132*b* with a third port 116*c* on the second bi-directional pump 110*b* and a fourth hydraulic line segment 134*d* that extends between and fluidly connects the fourth hydraulic line 132*d* with a fourth port 116*d* on the second bi-directional pump 110*b*.

The suspension system 100 also includes a front left bridge line 140*a* that extends between and fluidly connects the first hydraulic line 132*a* of the first hydraulic circuit 120*a* and the second hydraulic line 132*b* of the second hydraulic circuit 120*b* at a position located near the front left damper 102*a*, a front right bridge line 140*b* that extends between and fluidly connects the first hydraulic line 132*a* of the first hydraulic circuit 120*a* and the second hydraulic line 132*b* of the second hydraulic circuit 120*b* at a position located near the front right damper 102*b*, a back left bridge line 140*c* that extends between and fluidly connects the third hydraulic line 132*c* of the third hydraulic circuit 120*c* and the fourth hydraulic line 132*d* of the fourth hydraulic circuit 120*d* at a position located near the back left damper 102*c*, and a back right bridge line 140*d* that extends between and fluidly connects the third hydraulic line 132*c* of the third hydraulic circuit 120*c* and the fourth hydraulic line 132*d* of the fourth hydraulic circuit 120*d* at a position located near the back right damper 102*d*. The various hydraulic lines shown in the illustrated example are made of flexible tubing (e.g., hydraulic hoses), but it should be appreciated that other conduit structures and/or fluid passageways can be used.

The first hydraulic circuit 120*a* includes a first pair of variable flow control valves 160, 162 that are arranged at each end of the first hydraulic line 132*a* and are configured to regulate fluid flow between the first hydraulic circuit 120*a* and the first compression chamber 126*a* of the front left damper 102*a* and between the first hydraulic circuit 120*a* and the second rebound chamber 128*b* of the front right damper 102*b*, respectively. Similarly, the second hydraulic circuit 120*b* includes a second pair of variable flow control valves 164, 166 that are configured to regulate fluid flow between the second hydraulic circuit 120*b* and the first rebound chamber 128*a* of the front left damper 102*a* and between the first hydraulic circuit 120*a* and the second compression chamber 126*b* of the front right damper 102*b*, respectively. The third hydraulic circuit 120*c* includes a third pair of variable flow control valves 168, 170 that are arranged at each end of the third hydraulic line 132*c* and are configured to regulate fluid flow between the third hydraulic circuit 120*c* and the third compression chamber 126*c* of the back left damper 102*c* and between the third hydraulic circuit 120*c* and the fourth rebound chamber 128*d* of the back right damper 102*d*, respectively. Finally, the fourth hydraulic circuit 120*d* includes a fourth pair of variable flow control valves 172, 174 that are configured to regulate fluid flow between the fourth hydraulic circuit 120*d* and the third rebound chamber 128*c* of the back left damper 102*c* and between the fourth hydraulic circuit 120*d* and the fourth compression chamber 126*d* of the back right damper 102*d*, respectively. The variable flow control valves 160, 162, 164, 166, 168, 170, 172, 174 may be passive/spring-biased valves (e.g., spring-disc stacks) or active valves (e.g., electromechanical valves) and operate by controlling fluid flow into and out of the compression chambers 126*a*, 126*b*, 126*c*, 126*d* and rebound chambers 128*a*, 128*b*, 128*c*, 128*d* of the dampers 102*a*, 102*b*, 102*c*, 102*d* to change/adjust the rebound dampening rates and compression dampening rates. By way of example and without limitation, the variable flow control valves 160, 162, 164, 166, 168, 170, 172, 174 may be electromechanical valves with a combination of passive spring-disk elements and a solenoid. The solenoid of the variable flow control valves 160, 162, 164, 166, 168, 170, 172, 174 may be electrically connected to and actuated by controller 180 to change the damping characteristics of the dampers 102*a*, 102*b*, 102*c*, 102*d* (e.g., to soften or firm up the ride).

The first bi-directional pump 110*a* and second bi-directional pump 110*b* are connected to a hydraulic reservoir 112 (e.g., a tank) by first and second reservoir lines 113*a*, 113*b* that converge at a common reservoir line 114. The first reservoir line 113*a* extends between and fluidly connects the common reservoir line 114 and the first hydraulic line segment 134*a* of the first longitudinal hydraulic line 130*a*, while the second reservoir line 113*b* extends between and fluidly connects the common reservoir line 114 and the fourth hydraulic line segment 134*d* of the second longitudinal hydraulic line 130*b* and the common reservoir line 114. A third bi-directional pump 110*c* is arranged along and connected in-line with the common reservoir line 114 and includes fifth and sixth ports 116*e*, 116*f*. Each bi-directional pump 110*a*, 110*b*, 110*c* may operate (i.e., pump fluid) in two opposing directions depending on the polarity of the electricity that is supplied to the bi-directional pump 110*a*, 110*b*, 110*c*.

The first port 116*a* of the first bi-directional pump 110*a* may operate as either an inlet port or an outlet port depending on the direction the first bi-directional pump 110*a* is operating in and the same is true for the second port 116*b* of the first bi-directional pump 110*a*. As a result, the first bi-directional pump 110*a* can operate to pump hydraulic fluid from the first hydraulic line segment 134*a* of the first longitudinal hydraulic line 130*a* and therefore from the first hydraulic circuit 120*a*, to the second hydraulic line segment 134*b* of the first longitudinal hydraulic line 130*a* and therefore to the third hydraulic circuit 120*c*, or from the second hydraulic line segment 134*b* of the first longitudinal hydraulic line 130*a* and therefore from the third hydraulic circuit 120*c* and to the first hydraulic line segment 134*a* of the first longitudinal hydraulic line 130*a* and therefore to the first hydraulic circuit 120*a*. In the example where the first port 116*a* is operating as an inlet port for the first bi-directional pump 110*a* and the second port 116*b* is operating as an outlet port for the first bi-directional pump 110*a*, the first bi-directional pump 110*a* draws in hydraulic fluid from the first hydraulic line segment 134*a* via the first port 116*a* and discharges hydraulic fluid into the second hydraulic line segment 134*b* via the second port 116*b*. In the example where the second port 116*b* is operating as an inlet port for the first bi-directional pump 110*a* and the first port 116*a* is operating as an outlet port for the first bi-directional pump 110*a*, the first bi-directional pump 110*a* draws in hydraulic fluid from the second hydraulic line segment 134*b* via the second port 116*b* and discharges hydraulic fluid into the first hydraulic line segment 134*a* via the first port 116*a*.

The third port 116*c* of the second bi-directional pump 110*b* may operate as either an inlet port or an outlet port depending on the direction the second bi-directional pump 110*b* is operating in and the same is true for the fourth port 116*d* of the second bi-directional pump 110*b*. As a result, the second bi-directional pump 110*b* can operate to pump hydraulic fluid from the third hydraulic line segment 134*c* of the second longitudinal hydraulic line 130*b* and therefore from the second hydraulic circuit 120*b*, to the fourth hydraulic line segment 134*d* of the second longitudinal hydraulic line 130*b* and therefore the fourth hydraulic circuit 120*d*, or from the fourth hydraulic line segment 134*d* of the second longitudinal hydraulic line 130*b* and therefore from the fourth hydraulic circuit 120*d*, to the third hydraulic line segment 134*c* of the second longitudinal hydraulic line 130*b* and therefore to the third hydraulic circuit 120*c*. In the example where the third port 116*c* is operating as an inlet port for the second bi-directional pump 110*b* and the fourth port 116*d* is operating as an outlet port for the second bi-directional pump 110*b*, the second bi-directional pump 110*b* draws in hydraulic fluid from the third hydraulic line segment 134*c* via the third port 116*c* and discharges hydraulic fluid into the fourth hydraulic line segment 134*d* via the fourth port 116*d*. In the example where the fourth port 116*d* is operating as an inlet port for the second bi-directional pump 110*b* and the third port 116*c* is operating as an outlet port for the second bi-directional pump 110*b*, the second bi-directional pump 110*b* draws in hydraulic fluid from the fourth hydraulic line segment 134*d* via the fourth port 116*d* and discharges hydraulic fluid into the third hydraulic line segment 134*c* via the third port 116*c*.

A front left accumulator 142*a* is arranged in fluid communication with the first hydraulic line 132*a* such that the front left accumulator 142*a* is configured to regulate fluid pressure within the first hydraulic circuit 120*a*. A front right accumulator 142*b* is arranged in fluid communication with the second hydraulic line 132*b* such that the front right accumulator 142*b* is configured to regulate fluid pressure within the second hydraulic circuit 120*b*. A back left accumulator 142*c* is arranged in fluid communication with the third hydraulic line 132*c* such that the back left accumulator 142*c* is configured to regulate fluid pressure within the third hydraulic circuit 120*c*. A back right accumulator 142*d* is arranged in fluid communication with the fourth hydraulic line 132*d* such that the back right accumulator 142*d* is configured to regulate fluid pressure within the fourth hydraulic circuit 120*d*. Each of the accumulators 142*a*, 142*b*, 142*c*, 142*d* have a variable fluid volume that increases and decreases depending on the fluid pressure in the hydraulic circuits 120*a*, 120*b*, 120*c*, 120*d*. It should be appreciated that the accumulators 142*a*, 142*b*, 142*c*, 142*d* may be constructed in a number of different ways. For example and without limitation, the accumulators 142*a*, 142*b*, 142*c*, 142*d* may have accumulation chambers and pressurized gas chambers that are separated by floating pistons, flexible membranes, or bellows.

The suspension system 100 also includes six electro-mechanical shut-off (i.e., on/off) valves 144*a*, 144*b*, 144*c*, 144*d*, 146*a*, 146*b*. A front left shut-off valve 144*a* is positioned in the front left bridge line 140*a*, a front right shut-off valve 144*b* is positioned in the front right bridge line 140*b*, a back left shut-off valve 144*c* is positioned in the back left bridge line 140*c*, and a back right shut-off valve 144*d* is positioned in the back right bridge line 140*d*. A first reservoir shut-off valve 146*a* is positioned in the first reservoir line 113*a* and a second reservoir shut-off valve 146*b* is positioned in the second reservoir line 113*b*. In the illustrated example, the shut-off valves 144*a*, 144*b*, 144*c*, 144*d*, 146*a*, 146*b* are semi-active electro-mechanical valves with a combination of passive spring-disk elements and a solenoid that actuates the valve between open and closed positions.

The fifth port 116*e* of the third bi-directional pump 110*c* may operate as either an inlet port or an outlet port depending on the direction the third bi-directional pump 110*c* is operating in and the same is true for the sixth port 116*f* of the third bi-directional pump 110*c*. When the first and second reservoir shut-off valves 146*a*, 146*b* are open, the third bi-directional pump 110*c* can operate to pump hydraulic fluid from the first and second reservoir lines 113*a*, 113*b* and therefore from the first and second longitudinal hydraulic lines 130*a*, 130*b*, to the common reservoir line 114 and therefore to the reservoir 112 to decrease fluid pressure in the first and/or second longitudinal hydraulic lines 130*a*, 130*b*, or from the common reservoir line 114 and therefore from the reservoir 112, to the first and second reservoir lines 113*a*, 113*b* and therefore to the first and second longitudinal hydraulic lines 130*a*, 130*b* to increase fluid pressure in the first and second longitudinal hydraulic lines 130*a*, 130*b*. In the example where the fifth port 116*e* is operating as an inlet port for the third bi-directional pump 110*c* and the sixth port 116*f* is operating as an outlet port for the third bi-directional pump 110*c*, the third bi-directional pump 110*c* draws in hydraulic fluid from the first and second reservoir lines 113*a*, 113*b* depending on if the first and second reservoir shut-off valves 146*a*, 146*b* are open or closed via the fifth port 116*e* and discharges hydraulic fluid into the common reservoir line 114 via the sixth port 116*f*. In the example where the sixth port 116*f* is operating as an inlet port for the third bi-directional pump 110*c* and the fifth port 116*e* is operating as an outlet port for the third bi-directional pump 110*c*, the third bi-directional pump 110*c* draws in hydraulic fluid from the common reservoir line 114 via the sixth port 116*f* and discharges hydraulic fluid into the first and second reservoir lines 113*a*, 113*b* via the fifth port 116*e*. It should also be appreciated that the third bi-directional pump 110*c* can be run in either direction with the first reservoir shut-off valve 146*a* open and the second reservoir shut-off valve 146*b* closed to pump fluid into or out of the first longitudinal hydraulic line 130*a*. If the front left shut-off valve 144*a*, front right shut-off valve 144*b*, back left shut-off valve 144*c*, back right shut-off valve 144*d* are all closed, this will increase or decrease fluid pressure in just the first and third hydraulic circuits 120*a*, 120*c*. Similarly, the third bi-directional pump 110*c* can be run in either direction with the first reservoir shut-off valve 146*a* closed and the second reservoir shut-off valve 146*b* open to pump fluid into or out of the second longitudinal hydraulic line 130*b*. If the front left shut-off valve 144*a*, front right shut-off valve 144*b*, back left shut-off valve 144*c*, back right shut-off valve 144*d* are all closed, this will increase or decrease fluid pressure in just the second and fourth hydraulic circuits 120*b*, 120*d*.

The bi-directional pumps 110*a*, 110*b*, 110*c* and shut-off valves 144*a*, 144*b*, 144*c*, 144*d*, 146*a*, 146*b* are electrically connected to controller 180, which is configured to individually activate (i.e., turn on in forward or reverse) the bi-directional pumps 110*a*, 110*b*, 110*c* and individually open and close the shut-off valves 144*a*, 144*b*, 144*c*, 144*d*, 146*a*, 146*b* in response to various inputs, including fluid pressure. The anti-pitch and anti-roll capabilities of the suspension system 100 will be explained in greater detail below; however, from FIG. 2 it should be appreciated that fluid pressure in the hydraulic circuits 120*a*, 120*b*, 120*c*, 120*d* can be adjusted by operation of the bi-directional pumps 110*a*, 110*b*, 110*c* to dynamically adjust the pitch and roll stiffness of the suspension system 100, which changes the degree to which the vehicle will lean fore or aft (i.e., pitch) or to one side or the other (i.e., roll). Thus, the suspension system 100 described herein can either augment or completely replace mechanical stabilizer bars/anti-roll bars. Such mechanical systems require relatively straight, unobstructed runs between each of the front dampers 102*a*, 102*b* and each of the back dampers 102*c*, 102*d*. Accordingly, the suspension system 100 disclosed herein offers packaging benefits because the dampers 102*a*, 102*b*, 102*c*, 102*d* only need to be hydraulically connected to one another and the bi-directional pumps 110*a*, 110*b*, 110*c*.

To reduce fluid pressure in the hydraulic circuits 120*a*, 120*b*, 120*c*, 120*d* of the suspension system 100, the controller 180 activates the third bi-directional pump 110*c* to pump hydraulic fluid from the first and second longitudinal hydraulic lines 130*a*, 130*b* via the first and second reservoir lines 113*a*, 113*b* and into the reservoir 112 via the common reservoir lines 114. In this example, the front left shut-off valve 144*a*, front right shut-off valve 144*b*, back left shut-off valve 144*c*, back right shut-off valve 144*d* are all open and the first and second reservoir shut-off valves 146*a*, 146*b* are open. The fifth port 116*e* is operating as an inlet port for the third bi-directional pump 110*c* and the sixth port 116*f* is operating as an outlet port for the third bi-directional pump 110*c*. Accordingly, the third bi-directional pump 110*c* draws in hydraulic fluid from the first and second reservoir lines 113*a*, 113*b* via the fifth port 116*e* and discharges hydraulic fluid into the common reservoir line 114 via the sixth port 116*f*. Because the front left shut-off valve 144*a*, front right shut-off valve 144*b*, back left shut-off valve 144*c*, back right shut-off valve 144*d* are all open, the static pressure in all of the hydraulic circuits 120*a*, 120*b*, 120*c*, 120*d* is reduced.

To raise fluid pressure in the hydraulic circuits 120*a*, 120*b*, 120*c*, 120*d* of the suspension system 100, the controller 180 activates the third bi-directional pump 110*c* to pump hydraulic fluid from the reservoir 112 via the common reservoir lines 114 and into the first and second longitudinal hydraulic lines 130*a*, 130*b* via the first and second reservoir lines 113*a*, 113*b*. In this example, the front left shut-off valve 144*a*, front right shut-off valve 144*b*, back left shut-off valve 144*c*, back right shut-off valve 144*d* are all open and the first and second reservoir shut-off valves 146*a*, 146*b* are open. The sixth port 116*f* is operating as an inlet port for the third bi-directional pump 110*c* and the fifth port 116*e* is operating as an outlet port for the third bi-directional pump 110*c*. Accordingly, the third bi-directional pump 110*c* draws in hydraulic fluid from the common reservoir line 114 via the sixth port 116*f* and discharges hydraulic fluid into the first and second reservoir lines 113*a*, 113*b* via the fifth port 116*e*. Because the front left shut-off valve 144*a*, front right shut-off valve 144*b*, back left shut-off valve 144*c*, back right shut-off valve 144*d* are all open, the static pressure in all of the hydraulic circuits 120*a*, 120*b*, 120*c*, 120*d* is increased.

There are three primary types of suspension movements that the illustrated suspension system 100 can passively or actively control by changing or adapting the roll and/or pitch stiffness of the vehicle: leaning to one side or the other during cornering (i.e., roll), pitching forward during braking (i.e., brake dive), and pitching aft during acceleration (i.e., rear end squat). Descriptions of how the suspension system 100 reacts to each of these conditions are provided below.

Figure 3:
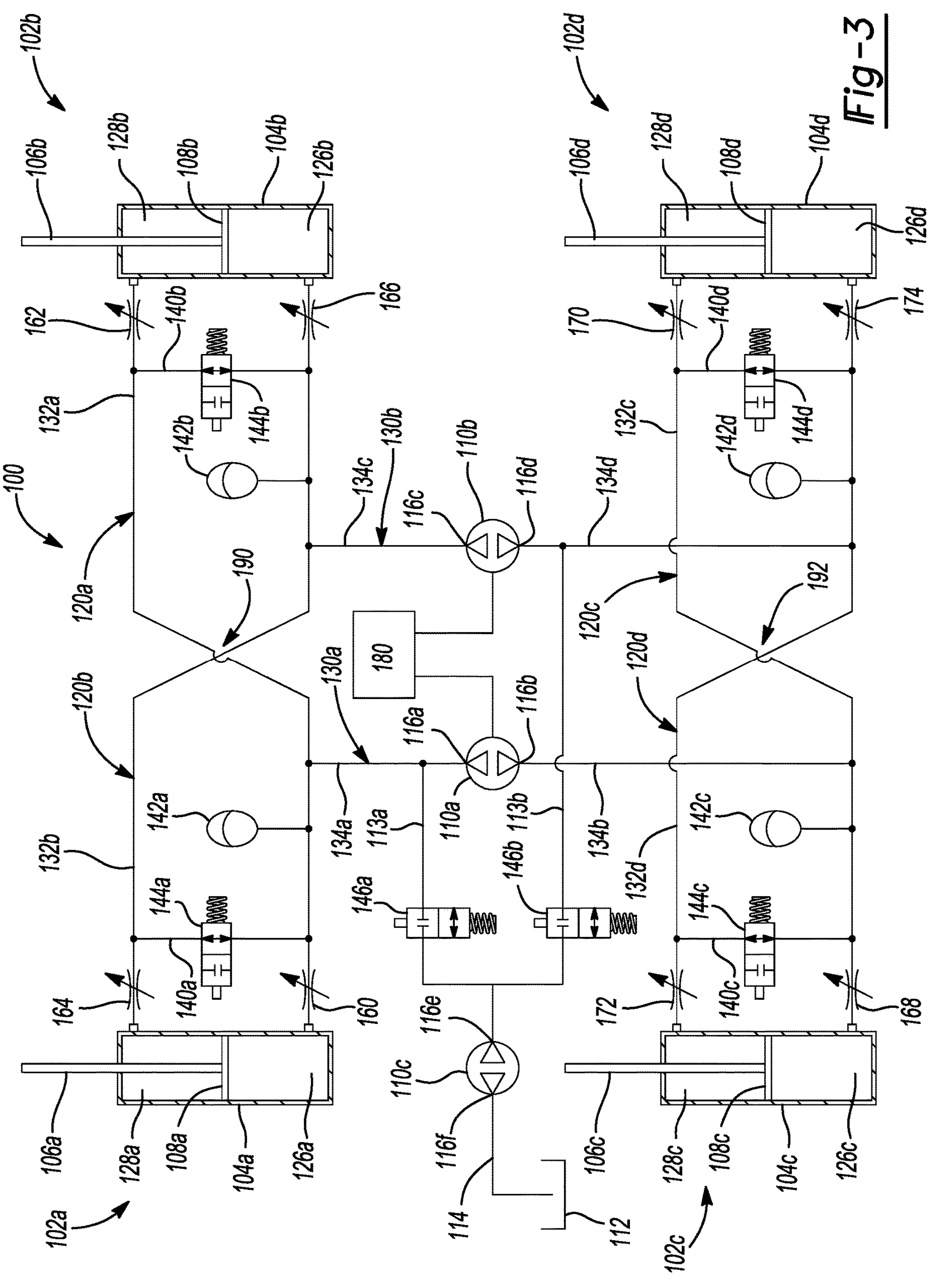
FIG. 3 is a schematic diagram illustrating the exemplary suspension system shown in FIG. 2 as it is operating in a comfort mode.

FIG. 3 illustrates the suspension system 100 in a comfort operating mode. When active roll and/or pitch stiffness is not required, the controller 180 may activate a comfort operating mode by opening the front left shut-off valve 144*a*, front right shut-off valve 144*b*, back left shut-off valve 144*c*, and back right shut-off valve 144*d*, while closing the first and second reservoir shut-off valves 146*a*, 146*b*. In the comfort operating mode, the bi-directional pumps 110*a*, 110*b*, 110*c* are powered off to maintain substantially equal static pressures within all four hydraulic circuits 120*a*, 120*b*, 120*c*, 120*d*. In the comfort operation mode fluid flow is therefore permitted through valves 144*a*, 144*b*, 144*c*, 144*d* to enhance the ride comfort of the suspension system 100 and reduce or eliminate unwanted suspension movements resulting from the hydraulic coupling of one damper of the system to another damper of the system (e.g., where the compression of one damper causes movement and/or a dampening change in another damper). For example, when the front left comfort valve 144*a* is open and the front left damper 102*a* undergoes a compression stroke as the front wheel hits a bump, fluid may flow from the first compression chamber 126*a* of the front left damper 102*a*, into the first hydraulic line 132*a*, from the first hydraulic line 132*a* to the second hydraulic line 132*b* by passing through the front left bridge line 140*a* and the front left comfort valve 144*a*, and into the first rebound chamber 128*a* of the front left damper 102*a*. Thus, fluid can travel from the first compression chamber 126*a* to the first rebound chamber 128*a* of the front left damper 102*a* with the only restriction coming from the variable control valves 160, 164, if any. As such, in the comfort operating mode, the dampers 102*a*, 102*b*, 102*c*, 102*d* are effectively decoupled from one another for improved ride comfort.

Figure 4:
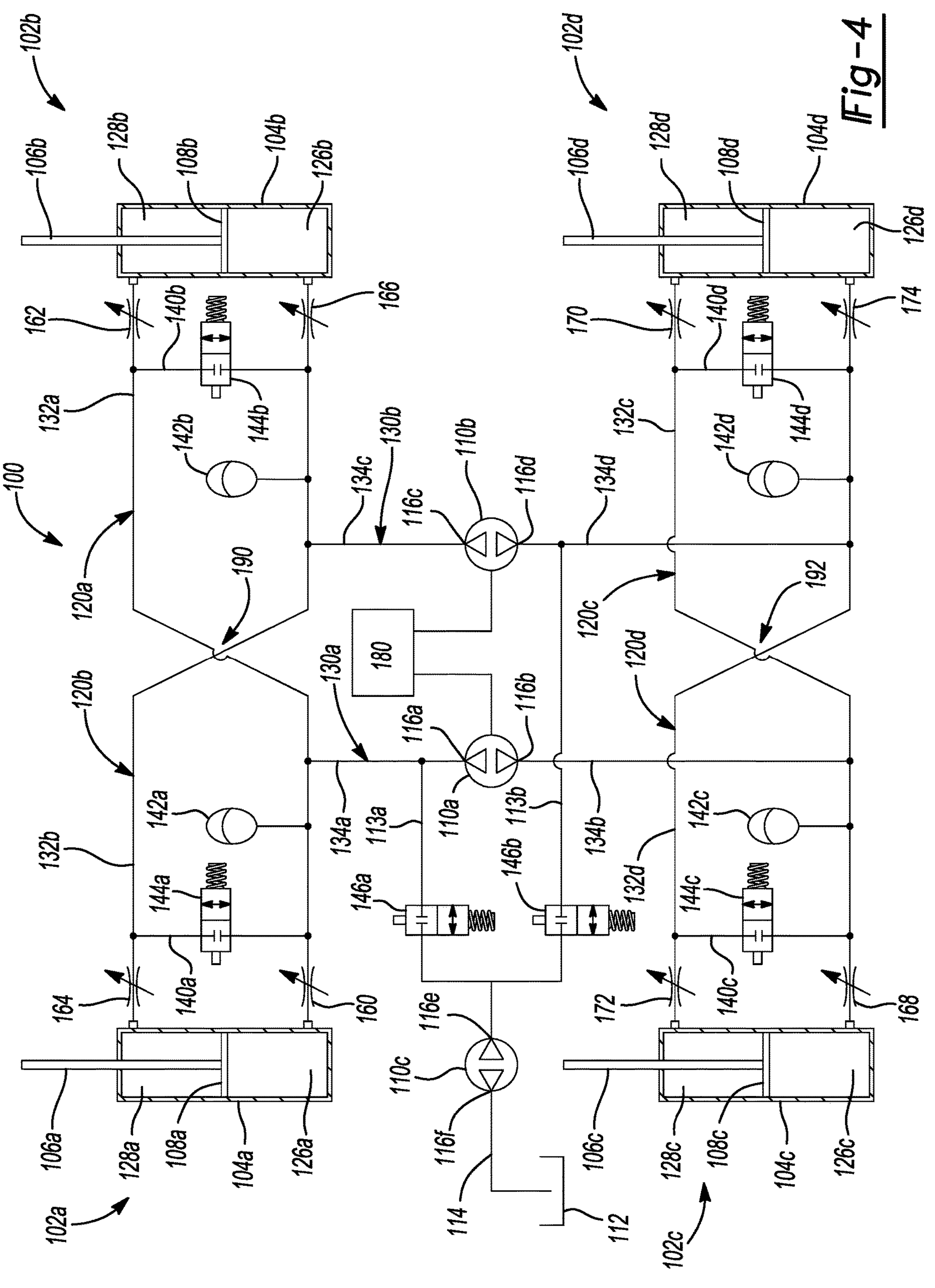
FIG. 4 is a schematic diagram illustrating the exemplary suspension system shown in FIG. 2 as it is operating in a passive roll control mode.

FIG. 4 illustrates the suspension system 100 in a passive roll control operating mode. When the vehicle is placed in a left turn, the momentum of the sprung weight of the vehicle body 103 tends to make the vehicle lean right towards the outside of the turn, compressing the front right damper 102*b* and the back right damper 102*d*. When this occurs, fluid flows out from the second compression chamber 126*b* of the front right damper 102*b* and the fourth compression chamber 126*d* of the back right damper 102*d* into the second and fourth hydraulic lines 132*b*, 132*d*. As a result of the weight transfer to the right side of the vehicle, the front left damper 102*a* and back left damper 102*c* begin to extend, causing fluid to flow out of the first rebound chamber 128*a* of the front left damper 102*a* and the third rebound chamber 128*c* of the back left damper 102*c* into the second and fourth hydraulic lines 132*b*, 132*d* causing pressure in the second and fourth hydraulic lines 132*b*, 132*d* to increase even further, which increases the pressure in the second compression chamber 126*b* of the front right damper 102*b* and the fourth compression chamber 126*d* of the back right damper 102*d* making the front right damper 102*b* and the back right damper 102*d* more difficult to compress. This counteracts the momentum/roll moment of the sprung weight of the vehicle body 103 as it attempts to roll or lean to the right.

When the vehicle is placed in a right turn, the momentum of the sprung weight of the vehicle body 103 tends to make the vehicle lean left towards the outside of the turn, compressing the front left damper 102*a* and the back left damper 102*c*. When this occurs, fluid flows out from the first compression chamber 126*a* of the front left damper 102*a* and the third compression chamber 126*c* of the back left damper 102*c* into the first and third hydraulic lines 132*a*, 132*c*. As a result of the weight transfer to the left side of the vehicle, the front right damper 102*b* and back right damper 102*d* begin to extend, causing fluid to flow out of the second rebound chamber 128*b* of the front right damper 102*b* and the fourth rebound chamber 128*d* of the back right damper 102*d* into the first and third hydraulic lines 132*a*, 132*c* causing pressure in the first and third hydraulic lines 132*a*, 132*c* to increase even further, which increases the pressure in the first compression chamber 126*a* of the front left damper 102*a* and the third compression chamber 126*c* of the back left damper 102*c* making the front left damper 102*a* and the back left damper 102*c* more difficult to compress. This counteracts the momentum/roll moment of the sprung weight of the vehicle body 103 as it attempts to roll or lean to the left.

The controller 180 activates the passive roll control operating mode by closing the front left shut-off valve 144*a*, front right shut-off valve 144*b*, back left shut-off valve 144*c*, back right shut-off valve 144*d*, and the first and second reservoir shut-off valves 146*a*. 146*b*. The bi-directional pumps 110*a*, 110*b*, 110*c* are all deactivated in the passive roll control operating mode.

Figure 5:
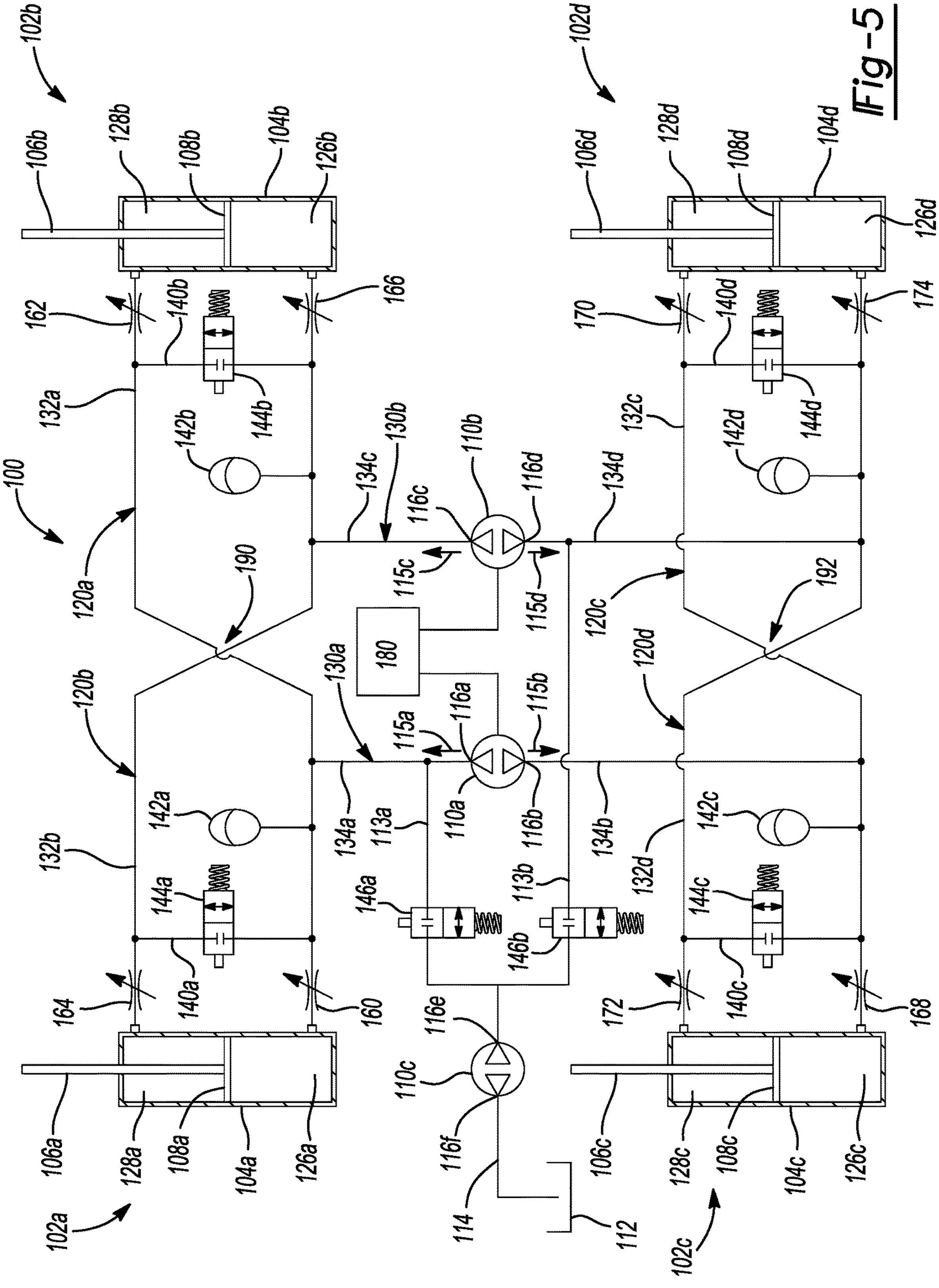
FIG. 5 is a schematic diagram illustrating the exemplary suspension system shown in FIG. 2 as it is operating in an active roll moment distribution control mode.

FIG. 5 illustrates the suspension system 100 in an active roll moment distribution control operating mode. In the roll moment distribution control operating mode, the controller 180 either actives the first and second bi-directional pumps 110*a*, 110*b* to pump hydraulic fluid towards the front axle in the first and third directions 115*a*, 115*c* to increase fluid pressure in the first and second hydraulic circuits 120*a*, 120*b* or actives the first and second bi-directional pumps 110*a*, 110*b* to pump hydraulic fluid towards the rear axle in the second and fourth directions 115*b*, 115*d* to increase fluid pressure in the third and fourth hydraulic circuits 120*c*, 120*d*. The suspension system 100 then makes use of the passive roll resistance described above, but at a higher static pressure in either the first and second hydraulic circuits 120*a*, 120*b* or the third and fourth hydraulic circuits 120*c*, 120*d* to counteract body roll during a turn. In the active roll moment distribution control operating mode, the controller 180 closes the front left shut-off valve 144*a*, front right shut-off valve 144*b*, back left shut-off valve 144*c*, back right shut-off valve 144*d*, and the first and second reservoir shut-off valves 146*a*. 146*b*, while activating the first and second bi-directional pumps 110*a*, 110*b* to pump hydraulic fluid in either the first and third directions 115*a*, 115*c* or in the second and fourth directions 115*b*, 115*d*. The third bi-directional pump 110*c* remains deactivated during this operation.

When the controller 180 actives the first and second bi-directional pumps 110*a*, 110*b* to pump hydraulic fluid towards the rear axle in the second and fourth directions 115*b*, 115*d* to increase fluid pressure in the third and fourth hydraulic circuits 120*c*, 120*d*, the first port 116*a* is operating as an inlet port for the first bi-directional pump 110*a* and the second port 116*b* is operating as an outlet port for the first bi-directional pump 110*a*. Similarly, the third port 116*c* is operating as an inlet port for the second bi-directional pump 110*b* and the fourth port 116*d* is operating as an outlet port for the second bi-directional pump 110*b*. Accordingly, the first bi-directional pump 110*a* draws in hydraulic fluid from the first hydraulic line segment 134*a* via the first port 116*a* and discharges hydraulic fluid into the second hydraulic line segment 134*b* via the second port 116*b* and the second bi-directional pump 110*b* draws in hydraulic fluid from the third hydraulic line segment 134*c* via the third port 116*c* and discharges hydraulic fluid into the fourth hydraulic line segment 134*d* via the fourth port 116*d*. As such, the first and second bi-directional pumps 110*a*, 110*b* operate to increase fluid pressure in the third and fourth hydraulic lines 132*c*, 132*d*, which increases the passive roll stiffness across the rear axle to counteract the momentum of the sprung weight of the vehicle body 103 as it attempts to roll/lean left or right during a turn.

When the controller 180 activates the first and second bi-directional pumps 110*a*, 110*b* to pump hydraulic fluid towards the front axle in the first and third directions 115*a*, 115*c* to increase fluid pressure in the first and second hydraulic circuits 120*a*, 120*b*, the first port 116*a* is operating as an outlet port for the first bi-directional pump 110*a* and the second port 116*b* is operating as an inlet port for the first bi-directional pump 110*a*. Similarly, the third port 116*c* is operating as an outlet port for the second bi-directional pump 110*b* and the fourth port 116*d* is operating as an inlet port for the second bi-directional pump 110*b*. Accordingly, the first bi-directional pump 110*a* draws in hydraulic fluid from the second hydraulic line segment 134*b* via the second port 116*b* and discharges hydraulic fluid into the first hydraulic line segment 134*a* via the first port 116*a* and the second bi-directional pump 110*b* draws in hydraulic fluid from the fourth hydraulic line segment 134*d* via the fourth port 116*d* and discharges hydraulic fluid into the third hydraulic line segment 134*c* via the third port 116*c*. As such, the first and second bi-directional pumps 110*a*, 110*b* operate to increase fluid pressure in the first and second hydraulic lines 132*a*, 132*b*, which increases the passive roll stiffness across the front axle to counteract the momentum of the sprung weight of the vehicle body 103 as it attempts to roll/lean left or right during a turn.

Figure 6:
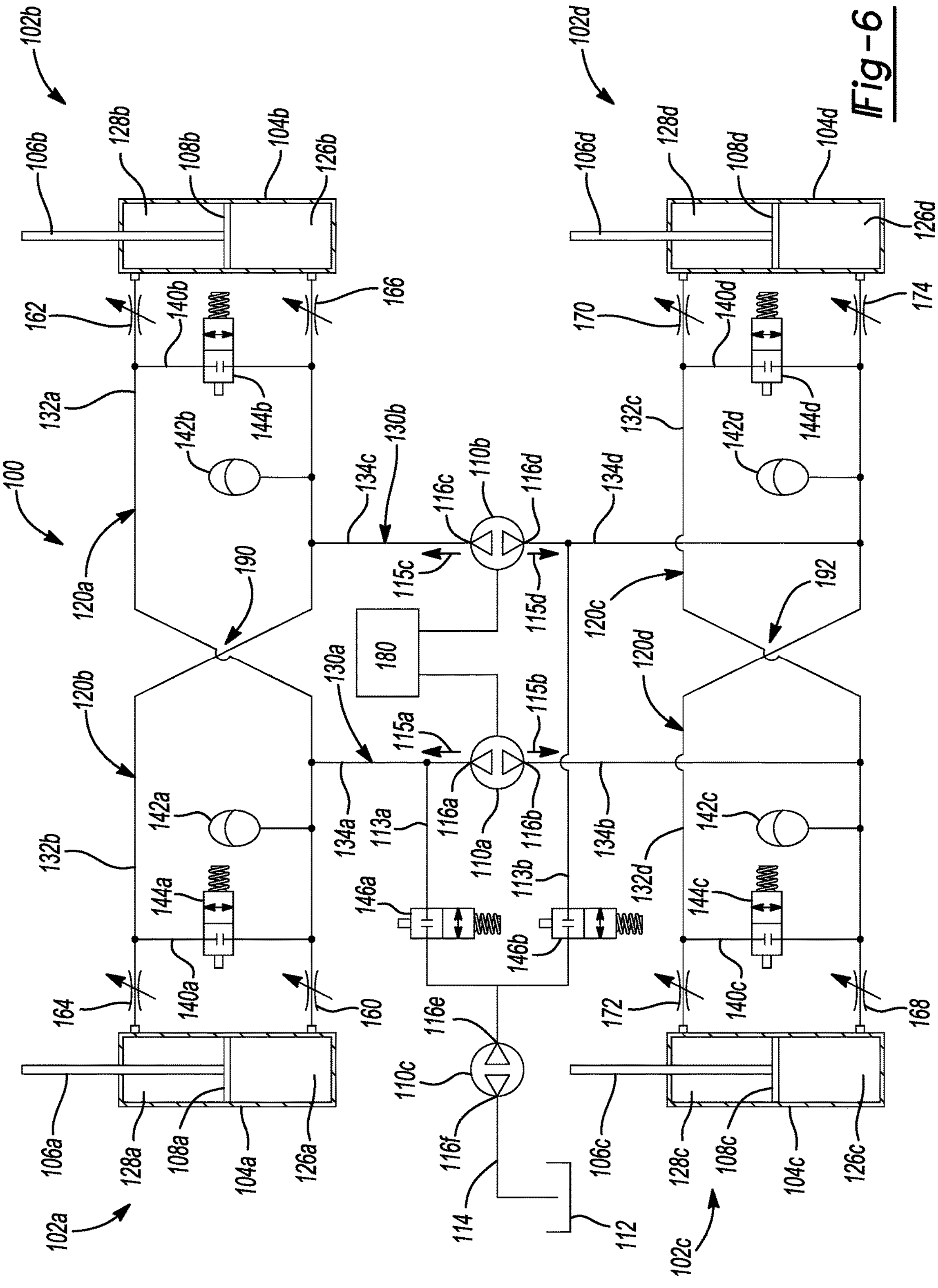
FIG. 6 is a schematic diagram illustrating the exemplary suspension system shown in FIG. 2 as it is operating in an active pitch control mode.

FIG. 6 illustrates the suspension system 100 in a pitch control operating mode. During acceleration, the momentum of the sprung weight of the vehicle body 103 tends to make the vehicle body 103 pitch or squat rearward (i.e., aft), compressing the back left damper 102*c* and the back right damper 102*d*. When this occurs, fluid flows out from the third compression chamber 126*c* of the back left damper 102*c* into the third hydraulic line 132*c* and out from the fourth compression chamber 126*d* of the back right damper 102*d* into the fourth hydraulic line 132*d*. As a result of the weight transfer to the back/rear of the vehicle, the front left damper 102*a* and front right damper 102*b* begin to extend, causing fluid to flow out of the first rebound chamber 128*a* of the front left damper 102*a* into the second hydraulic line 132*b* and out of the second rebound chamber 128*b* of the front right damper 102*b* into the first hydraulic line 132*a*. As this occurs, the controller 180 activates a pitch control operating mode by closing the front left shut-off valve 144*a*, front right shut-off valve 144*b*, back left shut-off valve 144*c*, back right shut-off valve 144*d*, and the first and second reservoir shut-off valves 146*a*, 146*b*, while activating the first and second bi-directional pumps 110*a*, 110*b* to pump hydraulic fluid in the second and fourth directions 115*b*, 115*d* from the first and third hydraulic line segments 134*a*, 134*c* and therefore the first and second hydraulic circuits 120*a*, 120*c* and into the second and fourth hydraulic line segments 134*b*, 134*d* and therefore the third and fourth hydraulic circuits 120*c*, 120*d*. The third bi-directional pump 110*c* remains deactivated during this operation.

In the illustrated example, the first port 116*a* is operating as an inlet port for the first bi-directional pump 110*a* and the second port 116*b* is operating as an outlet port for the first bi-directional pump 110*a*. Similarly, the third port 116*c* is operating as an inlet port for the second bi-directional pump 110*b* and the fourth port 116*d* is operating as an outlet port for the second bi-directional pump 110*b*. Accordingly, the first bi-directional pump 110*a* draws in hydraulic fluid from the first hydraulic line segment 134*a* via the first port 116*a* and discharges hydraulic fluid into the second hydraulic line segment 134*b* via the second port 116*b* and the second bi-directional pump 110*b* draws in hydraulic fluid from the third hydraulic line segment 134*c* via the third port 116*c* and discharges hydraulic fluid into the fourth hydraulic line segment 134*d* via the fourth port 116*d*. As such, the first and second bi-directional pumps 110*a*, 110*b* operate to increase fluid pressure in the third and fourth hydraulic lines 132*c*, 132*d*, which increases the pressure in the third compression chamber 126*c* of the back left damper 102*c* and the fourth compression chamber 126*d* of the back right damper 102*d* making the back left damper 102*c* and the back right damper 102*d* more difficult to compress. This counteracts the momentum of the sprung weight of the vehicle body 103 as it attempts to pitch or squat rearward (i.e., aft) during acceleration.

During braking, the momentum of the sprung weight of the vehicle body 103 tends to make the vehicle body 103 pitch or dive forward, compressing the front left damper 102*a* and the front right damper 102*b*. When this occurs, fluid flows out from the first compression chamber 126*a* of the front left damper 102*a* into the first hydraulic line 132*a* and out from the second compression chamber 126*b* of the front right damper 102*b* into the second hydraulic line 132*b*. As a result of the weight transfer to the front of the vehicle, the back left damper 102*c* and back right damper 102*d* begin to extend, causing fluid to flow out of the third rebound chamber 128*c* of the back left damper 102*c* into the third hydraulic line 132*c* and out of the fourth rebound chamber 128*d* of the back right damper 102*d* into the fourth hydraulic line 132*d*. As this occurs, the controller 180 activates the pitch control operating mode by closing the front left shut-off valve 144*a*, front right shut-off valve 144*b*, back left shut-off valve 144*c*, back right shut-off valve 144*d*, and the first and second reservoir shut-off valves 146*a*, 146*b*, while activating the first and second bi-directional pumps 110*a*,

110*b* to pump hydraulic fluid in the first and third directions 115*a*, 115*c* from the second and fourth hydraulic line segments 134*b*, 134*d* and therefore from the third and fourth hydraulic circuits 120*c*, 120*d* and into the first and third hydraulic line segments 134*a*, 134*c* and therefore into the first and second hydraulic circuits 120*a*, 120*b*. The third bi-directional pump 110*c* remains deactivated during this operation. In this example, the first port 116*a* is operating as an outlet port for the first bi-directional pump 110*a* and the second port 116*b* is operating as an inlet port for the first bi-directional pump 110*a*. Similarly, the third port 116*c* is operating as an outlet port for the second bi-directional pump 110*b* and the fourth port 116*d* is operating as an inlet port for the second bi-directional pump 110*b*. Accordingly, the first bi-directional pump 110*a* draws in hydraulic fluid from the second hydraulic line segment 134*b* via the second port 116*b* and discharges hydraulic fluid into the first hydraulic line segment 134*a* via the first port 116*a* and the second bi-directional pump 110*b* draws in hydraulic fluid from the fourth hydraulic line segment 134*d* via the fourth port 116*d* and discharges hydraulic fluid into the third hydraulic line segment 134*c* via the third port 116*c*. As such, the first and second bi-directional pumps 110*a*, 110*b* operate to increase fluid pressure in the first and second hydraulic lines 132*a*, 132*b*, which increases the pressure in the first compression chamber 126*a* of the front left damper 102*a* and the second compression chamber 126*b* of the front right damper 102*b* making the front left damper 102*a* and the front right damper 102*d* more difficult to compress. This counteracts the momentum of the sprung weight of the vehicle body 103 as it attempts to pitch or dive forward during braking.

Figure 7:
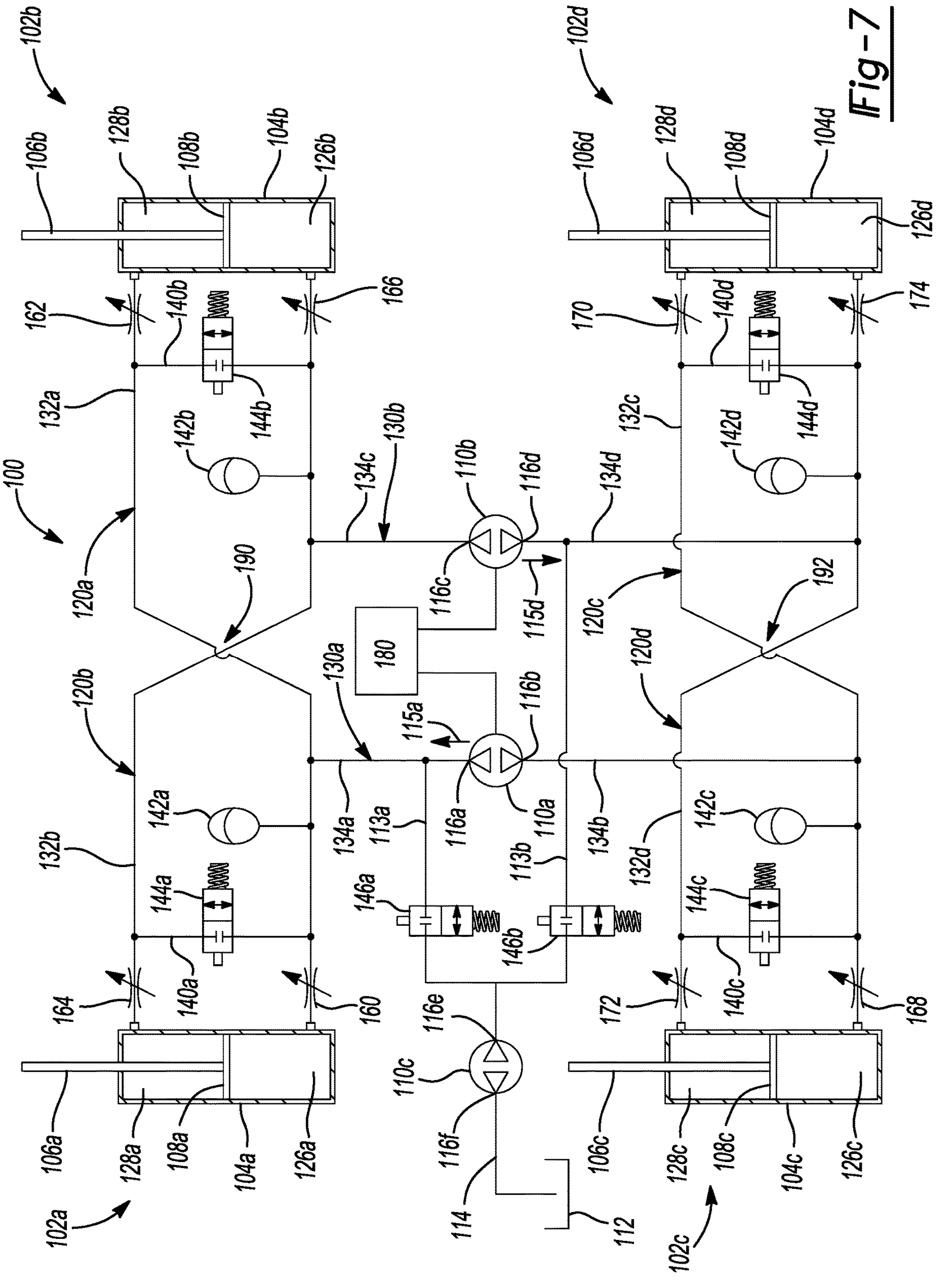
FIG. 7 is a schematic diagram illustrating the exemplary suspension system shown in FIG. 2 as it is operating in an active warp control mode.

FIG. 7 illustrates the suspension system 100 in a warp control operating mode, which permits greater or lesser amounts of articulation of the suspension system 100 during on-road or off-road maneuvers, for example. The controller 180 activates the warp control operating mode by closing the front left shut-off valve 144*a*, front right shut-off valve 144*b*, back left shut-off valve 144*c*, back right shut-off valve 144*d*, and the first and second reservoir shut-off valves 146*a*, 146*b*, while activating the first and second bi-directional pumps 110*a*, 110*b* to pump hydraulic fluid in opposite directions (e.g., in the first and fourth directions 115*a*, 115*d* or in the second and third directions 115*b*, 115*c*). The third bi-directional pump 110*c* remains deactivated during this operation.

For example, the controller 180 may activate the first bi-directional pump 110*a* to pump hydraulic fluid in the second direction 115*b* from the first hydraulic line segment 134*a* and therefore from the first hydraulic circuit 120*a* and into the second hydraulic line segment 134*b* and therefore the third hydraulic circuit 120*c*, while activating the second bi-directional pump 110*b* in the third direction 115*c* to pump hydraulic fluid from the fourth hydraulic line segment 134*d* and therefore from the fourth hydraulic circuit 120*d* and into the third hydraulic line segment 134*c* and therefore into the second hydraulic circuit 120*b*. In this example, the first port 116*a* is operating as an inlet port for the first bi-directional pump 110*a* and the second port 116*b* is operating as an outlet port for the first bi-directional pump 110*a*. By contrast, the third port 116*c* is operating as an outlet port for the second bi-directional pump 110*b* and the fourth port 116*d* is operating as an inlet port for the second bi-directional pump 110*b*. Accordingly, the first bi-directional pump 110*a* draws in hydraulic fluid from the first hydraulic line segment 134*a* via the first port 116*a* and discharges hydraulic fluid into the second hydraulic line segment 134*b* via the second port 116*b* and the second bi-directional pump 110*b* draws in hydraulic fluid from the fourth hydraulic line segment 134*d* via the fourth port 116*d* and discharges hydraulic fluid into the third hydraulic line segment 134*c* via the third port 116*c*. As a result, the first and second bi-directional pumps 110*a*, 110*b* operate to increase fluid pressure in the second and third hydraulic lines 132*b*, 132*c*, which increases the pressure in the second compression chamber 126*b* of the front right damper 102*b* and the third compression chamber 126*c* of the back left damper 102*c* making the front right damper 102*b* and the back left damper 102*c* more difficult to compress.

In another example, the controller 180 may activate the first bi-directional pump 110*a* to pump hydraulic fluid in the first direction 115*a* from the second hydraulic line segment 134*b* and therefore from the third hydraulic circuit 120*c* and into the first hydraulic line segment 134*a* and therefore the first hydraulic circuit 120*a*, while activating the second bi-directional pump 110*b* in the fourth direction 115*d* to pump hydraulic fluid from the third hydraulic line segment 134*c* and therefore from the second hydraulic circuit 120*b* and into the fourth hydraulic line segment 134*d* and therefore into the fourth hydraulic circuit 120*d*. In this example, the first port 116*a* is operating as an outlet port for the first bi-directional pump 110*a* and the second port 116*b* is operating as an inlet port for the first bi-directional pump 110*a*. By contrast, the third port 116*c* is operating as an inlet port for the second bi-directional pump 110*b* and the fourth port 116*d* is operating as an outlet port for the second bi-directional pump 110*b*. Accordingly, the first bi-directional pump 110*a* draws in hydraulic fluid from the second hydraulic line segment 134*b* via the second port 116*b* and discharges hydraulic fluid into the first hydraulic line segment 134*a* via the first port 116*a* and the second bi-directional pump 110*b* draws in hydraulic fluid from the third hydraulic line segment 134*c* via the third port 116*c* and discharges hydraulic fluid into the fourth hydraulic line segment 134*d* via the fourth port 116*d*. As a result, the first and second bi-directional pumps 110*a*, 110*b* operate to increase fluid pressure in the first and fourth hydraulic lines 132*a*, 132*d*, which increases the pressure in the first compression chamber 126*a* of the front left damper 102*a* and the fourth compression chamber 126*d* of the back right damper 102*d* making the front left damper 102*a* and the back right damper 102*d* more difficult to compress.

Figure 8:
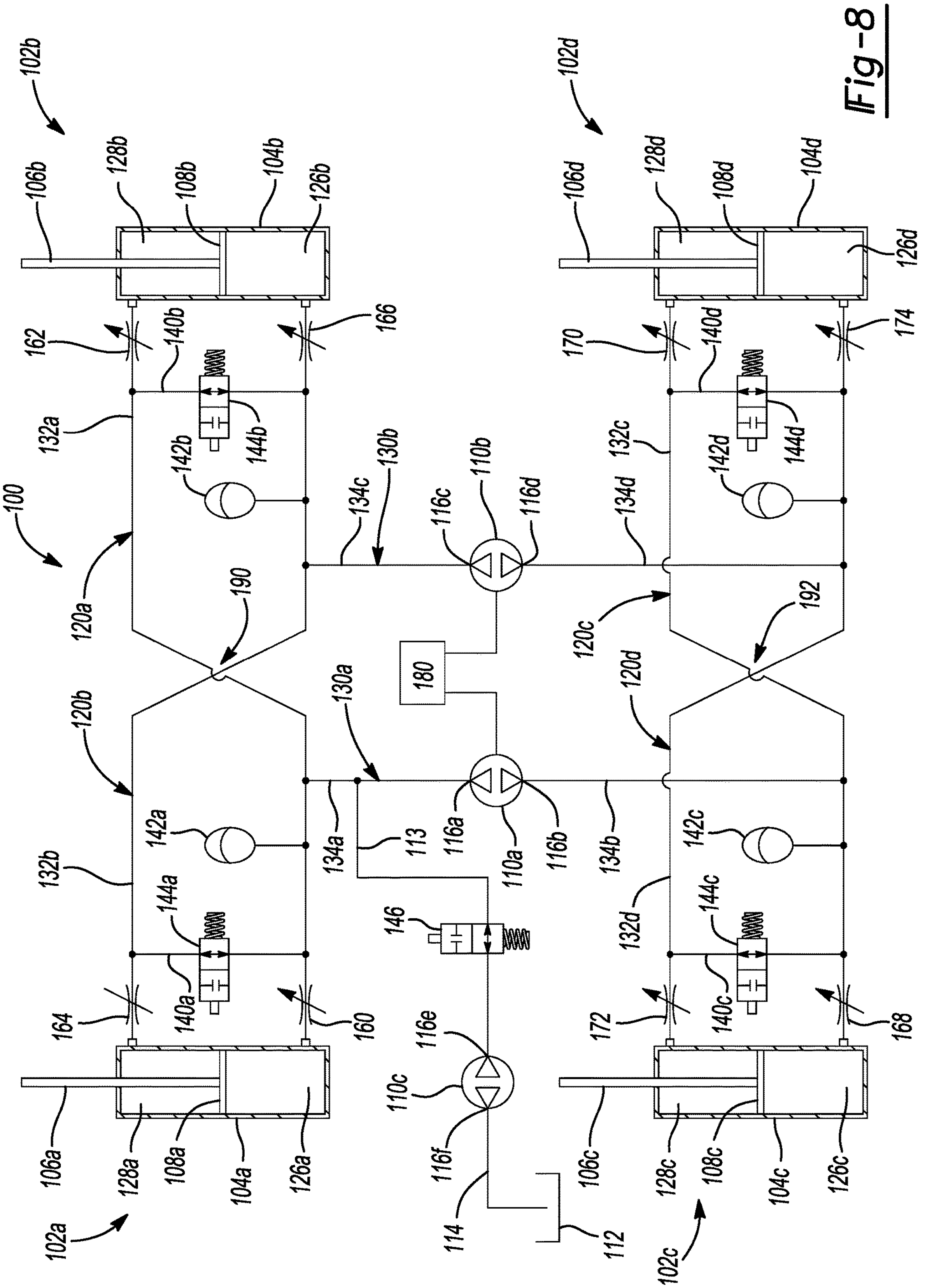
FIG. 8 is a schematic diagram illustrating another exemplary suspension system of the present disclosure that includes three bi-directional pumps as it is operating in a pressure control mode.

FIG. 8 illustrates a variation of the suspension system 100 illustrated in FIGS. 2-7, but the second reservoir line 113*b* and the second reservoir shut-off valve 146*b* shown in FIGS. 2-7 have been eliminated in FIG. 8. Rather than repeat the description set forth above, the following paragraphs describe the structure and function of the components in FIG. 8 that are new and/or different from those shown and described in connection with FIGS. 2-7. Thus, the same description for elements 100, 102*a*, 104*a* above applies to FIG. 8 and so on and so forth, except as otherwise noted.

In FIG. 8, the first longitudinal hydraulic line 130*a* is connected to the hydraulic reservoir 112 (e.g., a tank) by reservoir lines 113, 114. Reservoir line 113 extends between and fluidly connects the fifth port 116*e* of the third bi-directional pump 110*c* and the first hydraulic line segment 134*a* of the first longitudinal hydraulic line 130*a*, while reservoir line 114 extends between and fluidly connects the sixth port 116*f* of the third bi-directional pump 110*c* and the hydraulic reservoir 112. The third bi-directional pump 110*c* may operate (i.e., pump fluid) in two opposing directions to either pump fluid into or out of the first longitudinal hydraulic line 130*a*. When the front left shut-off valve 144*a*, front right shut-off valve 144*b*, back left shut-off valve 144*c*, back right shut-off valve 144*d*, and the reservoir shut-off valve 146 are all open, the third bi-directional pump 110*c* operates in a pressure control operating mode to either increase or decrease fluid pressure in all of the hydraulic circuits 120*a*-120*d* (i.e., to raise or lower the system pressure).

Figure 9:
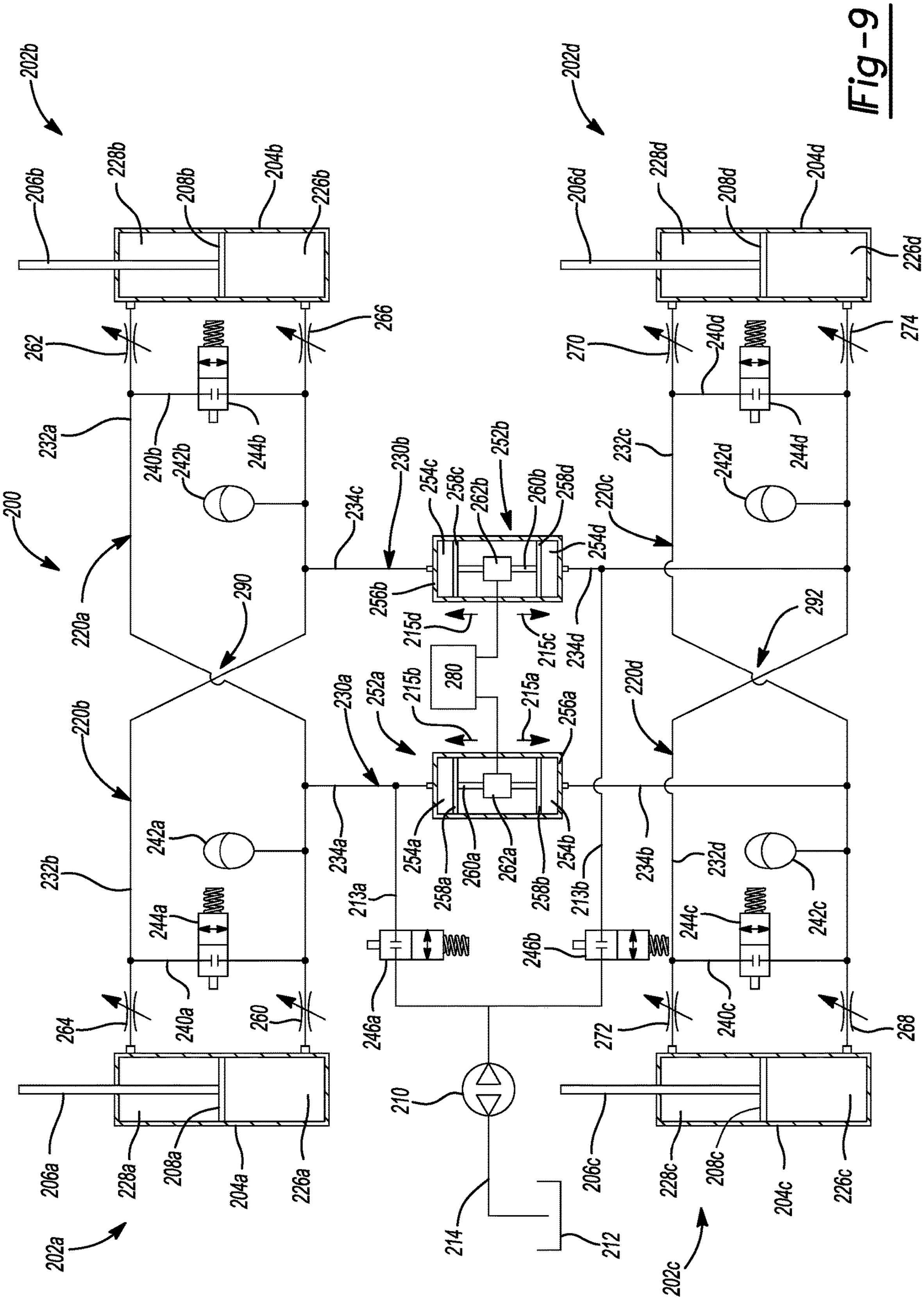
FIG. 9 is a schematic diagram illustrating an exemplary suspension system of the present disclosure that includes two dual chamber ball-screw mechanisms and one bi-directional pump.

FIG. 9 illustrates another suspension system 200 that shares many of the same components as the suspension system 100 illustrated in FIGS. 2-7, but the first and second bi-directional pumps 110*a*, 110*b* shown in FIGS. 2-7 have been replaced with first and second dual chamber ball-screw mechanisms 252*a*, 252*b* in FIG. 9. Rather than repeat the description set forth above, the following paragraphs describe the structure and function of the components in FIG. 9 that are new and/or different from those shown and described in connection with FIGS. 2-7. It should be appreciated that the reference numbers in FIG. 9 are "200" series numbers (e.g., 200, 202*a*, 204*a*, etc.), but otherwise share the same base reference numbers as the corresponding elements in FIGS. 2-7. Thus, the same description for elements 100, 102*a*, 104*a* above applies to elements 200, 202*a*, 204*a* in FIG. 9 and so on and so forth, except as otherwise noted.

As its name implies, the first dual chamber ball-screw mechanism 252*a* includes a first variable volume chamber 254*a* and a second variable volume chamber 254*b* at opposing ends of a first cylinder housing 256*a*. The first variable volume chamber 254*a* is arranged in fluid communication with the first hydraulic line segment 234*a* of the first longitudinal hydraulic line 230*a* and therefore the first hydraulic circuit 220*a*, while the second variable volume chamber 254*b* is arranged in fluid communication with the second hydraulic line segment 234*b* of the first longitudinal hydraulic line 230*a* and therefore the third hydraulic circuit 220*c*. The first and second variable volume chambers 254*a*, 254*b* are separated by a first pair of driven pistons 258*a*, 258*b*, which are connected to a move together in unison with a first threaded rod 260*a*. The first dual chamber ball-screw mechanisms 252*a* also includes a first motor 262*a* that is arranged in threaded engagement with the first threaded rod 260*a* and is therefore configured to drive the first threaded rod 260*a* and therefore the first pair of driven pistons 258*a*, 258*b* in first and second directions 215*a*, 215*b* within the first cylinder housing 256*a*. The first and second directions 215*a*, 215*b* are longitudinally opposed in relation to one another. When the first motor 262*a* drives the first threaded rod 260*a* and thus the first pair of driven pistons 258*a*, 258*b* in the first direction 215*a*, the volume of the first variable volume chamber 254*a* increases while the volume of the second variable volume chamber 254*b* decreases. This causes hydraulic fluid in the first hydraulic line segment 234*a* to flow into the first variable volume chamber 254*a* and hydraulic fluid in the second variable volume chamber 254*b* to flow out into the second hydraulic line segment 234*b*, which decreases fluid pressure in the first hydraulic circuit 220*a* and increases fluid pressure in the third hydraulic circuit 220*c*. When the first motor 262*a* drives the first threaded rod 260*a* and thus the first pair of driven pistons 258*a*, 258*b* in the second direction 215*b*, the volume of the first variable volume chamber 254*a* decreases while the volume of the second variable volume chamber 254*b* increases. This causes hydraulic fluid in the first variable volume chamber 254*a* to flow out into the first hydraulic line segment 234*a* and hydraulic fluid in the second hydraulic line segment 234*b* to flow into the second variable volume chamber 254*b*, which increases fluid pressure in the first hydraulic circuit 220*a* and decreases fluid pressure in the third hydraulic circuit 220*c*.

The second dual chamber ball-screw mechanism 252*b* includes a third variable volume chamber 254*c* and a fourth variable volume chamber 254*d* at opposing ends of a second cylinder housing 256*b*. The third variable volume chamber 254*c* is arranged in fluid communication with the third hydraulic line segment 234*c* of the second longitudinal hydraulic line 230*b* and therefore the second hydraulic circuit 220*b*, while the fourth variable volume chamber 254*d* is arranged in fluid communication with the fourth hydraulic line segment 234*d* of the second longitudinal hydraulic line 230*b* and therefore the fourth hydraulic circuit 220*d*. The third and fourth variable volume chambers 254*c*, 254*d* are separated by a second pair of driven pistons 258*c*, 258*d*, which are connected to a move together in unison with a second threaded rod 260*b*. The second dual chamber ball-screw mechanisms 252*b* also includes a second motor 262*b* that is arranged in threaded engagement with the second threaded rod 260*b* and is therefore configured to drive the second threaded rod 260*b* and therefore the second pair of driven pistons 258*c*, 258*d* in third and fourth directions 215*c*, 215*d* within the second cylinder housing 256*b*. The third and fourth directions 215*c*, 215*d* are longitudinally opposed in relation to one another. When the second motor 262*b* drives the second threaded rod 260*b* and thus the second pair of driven pistons 258*c*, 258*d* in the third direction 215*c*, the volume of the third variable volume chamber 254*c* increases while the volume of the fourth variable volume chamber 254*d* decreases. This causes hydraulic fluid in the third hydraulic line segment 234*c* to flow into the third variable volume chamber 254*c* and hydraulic fluid in the fourth variable volume chamber 254*d* to flow out into the fourth hydraulic line segment 234*d*, which decreases fluid pressure in the second hydraulic circuit 220*b* and increases fluid pressure in the fourth hydraulic circuit 220*d*. When the second motor 262*b* drives the second threaded rod 260*b* and thus the second pair of driven pistons 258*c*, 258*d* in the fourth direction 215*d*, the volume of the third variable volume chamber 254*c* decreases while the volume of the fourth variable volume chamber 254*d* increases. This causes hydraulic fluid in the third variable volume chamber 254*c* to flow out into the third hydraulic line segment 234*c* and hydraulic fluid in the fourth hydraulic line segment 234*d* to flow into the fourth variable volume chamber 254*d*, which increases fluid pressure in the second hydraulic circuit 220*b* and decreases fluid pressure in the fourth hydraulic circuit 220*d*.

The first and second motors 262*a*, 262*b* are electrically connected to and controlled by controller 280 and rotate in clockwise or counterclockwise directions depending on the polarity of the electric current supplied to the first and second motors 262*a*, 262*b* by the controller 280. This in turn drives linear/longitudinal movement of the first and second threaded rods 260*a*, 260*b* in opposite directions. The first hydraulic line segment 234*a* of the first longitudinal hydraulic line 230*a* and the fourth hydraulic line segment 234*d* of the second longitudinal hydraulic line 230*b* are connected to a hydraulic reservoir 212 (e.g., a tank) by first and second reservoir lines 213*a*, 213*b* that converge at a common reservoir line 214. First and second reservoir shut-off valves 246*a*, 246*b* are arranged along and in-line with the first and second reservoir lines 213*a*, 213*b*. A bi-directional pump 210 is arranged in-line and in fluid communication with the common reservoir line 214. The bi-directional pump 210 may operate (i.e., pump fluid) in two opposing directions depending on the polarity of the electricity that is supplied to the bi-directional pump 210 by the controller 280. Thus, the controller 280 can implement the same operating modes described above in connection with FIGS. 3-7.

Figure 10:
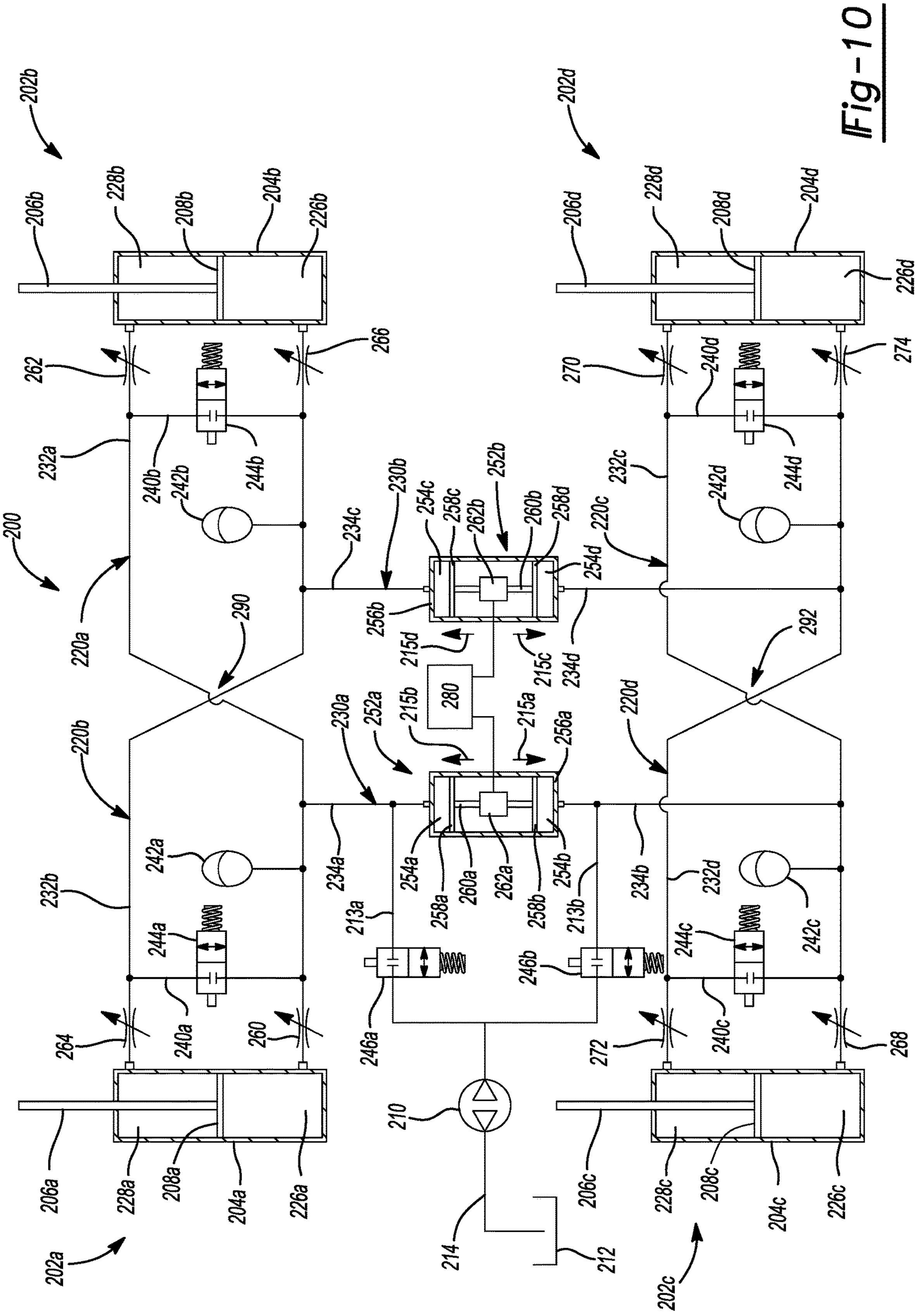
FIG. 10 is a schematic diagram illustrating another exemplary suspension system of the present disclosure that includes two dual chamber ball-screw mechanisms and one bi-directional pump.

FIG. 10 illustrates a variation of the suspension system 200 illustrated in FIG. 9, but the second reservoir line 213*b* shown in FIG. 9 is connected to the second hydraulic line segment 234*b* of the first longitudinal hydraulic line 230*a*, instead of to the fourth hydraulic line segment 234*d* of the second longitudinal hydraulic line 230*b* like in FIG. 9. Rather than repeat the description set forth above, the following paragraphs describe the structure and function of the components in FIG. 10 that are new and/or different from those shown and described in connection with FIG. 9. Thus, the same description for elements 200, 202*a*, 204*a* above applies to FIG. 10 and so on and so forth, except as otherwise noted.

The first hydraulic line segment 234*a* of the first longitudinal hydraulic line 230*a* and the second hydraulic line segment 234*b* of the first longitudinal hydraulic line 230*a* are connected to the hydraulic reservoir 212 (e.g., a tank) by first and second reservoir lines 213*a*, 213*b* that converge at a common reservoir line 214. The first and second reservoir shut-off valves 246*a*, 246*b* are arranged along and in-line with the first and second reservoir lines 213*a*, 213*b*. The bi-directional pump 210 is arranged in-line and in fluid communication with the common reservoir line 214. The bi-directional pump 210 may operate (i.e., pump fluid) in two opposing directions depending on the polarity of the electricity that is supplied to the bi-directional pump 210 by the controller 280. When the front left shut-off valve 244*a*, front right shut-off valve 244*b*, back left shut-off valve 244*c*, back right shut-off valve 244*d* are all open, the bi-directional pump 210 operates to either increase or decrease fluid pressure in all of the hydraulic circuits 220*a*-220*d* (i.e., to raise or lower the system pressure).

Many other modifications and variations of the present disclosure are possible in light of the above teachings and may be practiced otherwise than as specifically described while within the scope of the appended claims.

What is claimed is:

1. A suspension system, comprising:

- a front left damper including a first compression chamber and a first rebound chamber;
- a front right damper including a second compression chamber and a second rebound chamber;
- a back left damper including a third compression chamber and a third rebound chamber;
- a back right damper including a fourth compression chamber and a fourth rebound chamber;
- a first hydraulic circuit that fluidly connects said first compression chamber of said front left damper and said second rebound chamber of said front right damper;
- a second hydraulic circuit that fluidly connects said first rebound chamber of said front left damper and said second compression chamber of said front right damper;
- a third hydraulic circuit that fluidly connects said third compression chamber of said back left damper and said fourth rebound chamber of said back right damper;
- a fourth hydraulic circuit that fluidly connects said third rebound chamber of said back left damper and said fourth compression chamber of said back right damper;
- a first longitudinal hydraulic line extending between and fluidly connecting said first and third hydraulic circuits;
- a second longitudinal hydraulic line extending between and fluidly connecting said second and fourth hydraulic circuits;
- a first bi-directional pump that is arranged along and fluidly connected to said first longitudinal hydraulic line, said first bi-directional pump having a first operating mode for pumping hydraulic fluid in a first direction from said first hydraulic circuit to said third hydraulic circuit and a second operating mode for pumping hydraulic fluid in a second direction from said third hydraulic circuit to said first hydraulic circuit; and
- a second bi-directional pump that is arranged along and fluidly connected to said second longitudinal hydraulic line, said second bi-directional pump having a third operating mode for pumping hydraulic fluid in a third direction from said second hydraulic circuit to said fourth hydraulic circuit and a fourth operating mode for pumping hydraulic fluid in a fourth direction from said fourth hydraulic circuit to said second hydraulic circuit;
- a reservoir that is arranged in fluid communication with said first and second longitudinal hydraulic lines; and
- a third bi-directional pump that is arranged between and connected in fluid communication with said reservoir and said first and second longitudinal hydraulic lines, said third bi-directional pump having a fifth operating mode for pumping hydraulic fluid in a fifth direction from said reservoir to at least one of said first and second longitudinal hydraulic lines and a sixth operating mode for pumping hydraulic fluid in a sixth direction from at least one of said first and second longitudinal hydraulic lines to said reservoir.

2. The suspension system as set forth in claim 1, wherein said first bi-directional pump includes a first port that is configured as an inlet in said first operating mode and an outlet in said second operating mode, wherein said first bi-directional pump includes a second port that is configured as an outlet in said first operating mode and an inlet in said second operating mode, wherein said second bi-directional pump includes a third port that is configured as an inlet in said third operating mode and an outlet in said fourth operating mode, and wherein said second bi-directional pump includes a fourth port that is configured as an outlet in said third operating mode and an inlet in said fourth operating mode.

3. The suspension system as set forth in claim 2, wherein said first hydraulic circuit includes a first hydraulic line that extends between and fluidly connects said first compression chamber of said front left damper and said second rebound chamber of said front right damper, wherein said second hydraulic circuit includes a second hydraulic line that extends between and fluidly connects said first rebound chamber of said front left damper and said second compression chamber of said front right damper, wherein said third hydraulic circuit includes a third hydraulic line that extends between and fluidly connects said third compression chamber of said back left damper and said fourth rebound chamber of said back right damper, wherein said fourth hydraulic circuit includes a fourth hydraulic line that extends between and fluidly connects said third rebound chamber of said back left damper and said fourth compression chamber of said back right damper, wherein said first longitudinal hydraulic line includes a first hydraulic line segment that extends between and fluidly connects said first hydraulic line and said first port of said first bi-directional pump, wherein said first longitudinal hydraulic line includes a second hydraulic line segment that extends between and fluidly connects said third hydraulic line and said second port of said first bi-directional pump, wherein said second longitudinal hydraulic line includes a third hydraulic line segment that extends between and fluidly connects said second hydraulic line and said third port of said second bi-directional pump, and wherein said second longitudinal hydraulic line includes a fourth hydraulic line segment that extends between and fluidly connects said fourth hydraulic line and said fourth port of said second bi-directional pump.

4. The suspension system as set forth in claim 1, wherein said third bi-directional pump includes a fifth port that is configured as an inlet in said fifth operating mode and an outlet in said sixth operating mode and wherein said third bi-directional pump includes a sixth port that is configured as an outlet in said fifth operating mode and an inlet in said sixth operating mode.

5. The suspension system as set forth in claim 4, further comprising:

a common reservoir line that extends between and fluidly connects said reservoir and said sixth port of said third bi-directional pump;

a first reservoir line that is arranged in fluid communication with said first longitudinal hydraulic line and said fifth port of said third bi-directional pump; and a first reservoir shut-off valve positioned in said first reservoir line, the first reservoir shut-off valve being a two position electro-mechanical valve with a fully open position and a fully closed position.

6. The suspension system as set forth in claim 5, further comprising:

a second reservoir line that is arranged in fluid communication with said second longitudinal hydraulic line and said fifth port of said third bi-directional pump; and a second reservoir shut-off valve positioned in said second reservoir line, the second reservoir shut-off valve being a two position electro-mechanical valve with a fully open position and a fully closed position.

7. The suspension system as set forth in claim 1, further comprising:

a front left bridge line that extends between and fluidly connects said first and second hydraulic lines at a location adjacent to said front left damper;

a front right bridge line that extends between and fluidly connects said first and second hydraulic lines at a location adjacent to said front right damper;

a back left bridge line that extends between and fluidly connects said third and fourth hydraulic lines at a location adjacent to said back left damper; and a back right bridge line that extends between and fluidly connects said third and fourth hydraulic lines at a location adjacent to said back right damper.

8. The suspension system as set forth in claim 7, further comprising:

a front left shut-off valve that is positioned in said front left bridge line;

a front right shut-off valve that is positioned in said front right bridge line;

a back left shut-off valve that is positioned in said back left bridge line; and a back right shut-off valve that is positioned in said back right bridge line, wherein said front left shut-off valve, said front right shut-off valve, said back left shut-off valve, and said back right shut-off valve are two position electro-mechanical valves, each having a fully open position and a fully closed position.

9. The suspension system as set forth in claim 8, wherein said first hydraulic circuit includes a first pair of variable control valves at opposing ends of said first hydraulic line, said second hydraulic circuit includes a second pair of variable control valves at opposing ends of said second hydraulic line, said third hydraulic circuit includes a third pair of variable control valves at opposing ends of said third hydraulic line, and said fourth hydraulic circuit includes a fourth pair of variable control valves at opposing ends of said fourth hydraulic line.

10. A suspension system, comprising:

a front left damper including a first compression chamber and a first rebound chamber;

a front right damper including a second compression chamber and a second rebound chamber;

a back left damper including a third compression chamber and a third rebound chamber;

a back right damper including a fourth compression chamber and a fourth rebound chamber;

a first hydraulic circuit that fluidly connects said first compression chamber of said front left damper and said second rebound chamber of said front right damper;

a second hydraulic circuit that fluidly connects said first rebound chamber of said front left damper and said second compression chamber of said front right damper;

a third hydraulic circuit that fluidly connects said third compression chamber of said back left damper and said fourth rebound chamber of said back right damper;

a fourth hydraulic circuit that fluidly connects said third rebound chamber of said back left damper and said fourth compression chamber of said back right damper;

a first longitudinal hydraulic line extending between and fluidly connecting said first and third hydraulic circuits;

a second longitudinal hydraulic line extending between and fluidly connecting said second and fourth hydraulic circuits;

a first bi-directional pump that is arranged along and fluidly connected to said first longitudinal hydraulic line, said first bi-directional pump having a first operating mode for pumping hydraulic fluid in a first direction from said first hydraulic circuit to said third hydraulic circuit and a second operating mode for pumping hydraulic fluid in a second direction from said third hydraulic circuit to said first hydraulic circuit;

a second bi-directional pump that is arranged along and fluidly connected to said second longitudinal hydraulic line, said second bi-directional pump having a third operating mode for pumping hydraulic fluid in a third direction from said second hydraulic circuit to said fourth hydraulic circuit and a fourth operating mode for pumping hydraulic fluid in a fourth direction from said fourth hydraulic circuit to said second hydraulic circuit;

one or more controllers electrically connected to said first and second bi- directional pumps and programmed to concurrently or independently activate at least one of said first and second operating modes of said first bi-directional pump and at least one of said third and fourth operating modes of said second bi-directional pump;

a front left bridge line that extends between and fluidly connects said first and second hydraulic circuits;

a front left shut-off valve that is positioned in said front left bridge line;

a front right bridge line that extends between and fluidly connects said first and second hydraulic circuits;

a front right shut-off valve that is positioned in said front right bridge line;

a back left bridge line that extends between and fluidly connects said third and fourth hydraulic circuits;

a back left shut-off valve that is positioned in said back left bridge line;

a back right bridge line that extends between and fluidly connects said third and fourth hydraulic circuits; and a back right shut-off valve that is positioned in said back right bridge line, wherein said front left shut-off valve, said front right shut-off valve, said back left shut-off valve, and said back right shut-off valve are two position electro-mechanical valves, each having a fully open position and a fully closed position.

11. The suspension system as set forth in claim 10, wherein said one or more controllers are programmed to initiate:

a comfort operating mode where said first and second bi-directional pumps are deactivated and where each of said front left shut-off valve, said front right shut-off valve, said back left shut-off valve, and said back right shut-off valve are in said fully open position.

12. The suspension system as set forth in claim 11, wherein said one or more controllers are programmed to initiate:

a passive roll control operating mode where said first and second bi-directional pumps are deactivated and where each of said front left shut-off valve, said front right shut-off valve, said back left shut-off valve, and said back right shut-off valve are in said fully closed position to provide passive roll stiffness that counteracts vehicle body roll.

13. The suspension system as set forth in claim 12, wherein said one or more controllers are programmed to initiate:

a first active roll moment distribution control operating mode where said first bi-directional pump is activated in said first operating mode while said second bi-directional pump is activated in said third operating mode to increase fluid pressure in said third and fourth hydraulic circuits and increase said passive roll stiffness in said back left damper and said back right damper; and a second active roll moment distribution control operating mode where said first bi-directional pump is activated in said second operating mode while said second bi-directional pump is activated in said fourth operating mode to increase fluid pressure in said first and second hydraulic circuits and increase said passive roll stiffness in in said front left damper and said front right damper.

14. The suspension system as set forth in claim 13, wherein said one or more controllers are programmed to initiate:

a first pitch control operating mode where said first bi-directional pump is activated in said first operating mode while said second bi-directional pump is activated in said third operating mode to increase fluid pressure in said third and fourth hydraulic circuits and increase compression stiffness in said back left damper and said back right damper; and a second pitch control operating mode where said first bi-directional pump is activated in said second operating mode while said second bi-directional pump is activated in said fourth operating mode to increase fluid pressure in said first and second hydraulic circuits and increase compression stiffness in said front left damper and said front right damper.

15. The suspension system as set forth in claim 14, wherein said one or more controllers are programmed to initiate:

a warp control operating mode where said first bi-directional pump is activated in said first operating mode while said second bi-directional pump is activated in said fourth operating mode or where said first bi-directional pump is activated in said second operating mode while said second bi-directional pump is activated in said third operating mode.

16. A suspension system, comprising:

a front left damper including a first compression chamber and a first rebound chamber;

a front right damper including a second compression chamber and a second rebound chamber;

a back left damper including a third compression chamber and a third rebound chamber;

a back right damper including a fourth compression chamber and a fourth rebound chamber;

a first hydraulic circuit that fluidly connects said first compression chamber of said front left damper and said second rebound chamber of said front right damper;

a second hydraulic circuit that fluidly connects said first rebound chamber of said front left damper and said second compression chamber of said front right damper;

a third hydraulic circuit that fluidly connects said third compression chamber of said back left damper and said fourth rebound chamber of said back right damper;

a fourth hydraulic circuit that fluidly connects said third rebound chamber of said back left damper and said fourth compression chamber of said back right damper;

a first longitudinal hydraulic line extending between and fluidly connecting said first and third hydraulic circuits;

a second longitudinal hydraulic line extending between and fluidly connecting said second and fourth hydraulic circuits;

a reservoir that is arranged in fluid communication with at least one of said first and second longitudinal hydraulic lines;

a first bi-directional pump that is arranged along and fluidly connected to said first longitudinal hydraulic line, said first bi-directional pump having a first operating mode for pumping hydraulic fluid in a first direction from said first hydraulic circuit to said third hydraulic circuit and a second operating mode for pumping hydraulic fluid in a second direction from said third hydraulic circuit to said first hydraulic circuit;

a second bi-directional pump that is arranged along and fluidly connected to said second longitudinal hydraulic line, said second bi-directional pump having a third operating mode for pumping hydraulic fluid in a third direction from said second hydraulic circuit to said fourth hydraulic circuit and a fourth operating mode for pumping hydraulic fluid in a fourth direction from said fourth hydraulic circuit to said second hydraulic circuit; and a third bi-directional pump that is arranged between and fluidly connected to said reservoir and at least one of said first and second longitudinal hydraulic lines, said third bi-directional pump having a fifth operating mode for pumping hydraulic fluid in a fifth direction from said reservoir to at least one of said first and second longitudinal hydraulic lines and a sixth operating mode for pumping hydraulic fluid in a sixth direction from at least one of said first and second longitudinal hydraulic lines to said reservoir.

17. The suspension system as set forth in claim 16, further comprising:

a common reservoir line that extends between and fluidly connects said reservoir and said third bi-directional pump; and a first reservoir line that is arranged in fluid communication with said first longitudinal hydraulic line and said third bi-directional pump.

18. The suspension system as set forth in claim 17, further comprising:

a second reservoir line that is arranged in fluid communication with said second longitudinal hydraulic line and said third bi-directional pump.

* * * * *